United States Patent
Katz

(10) Patent No.: US 7,178,129 B2
(45) Date of Patent: Feb. 13, 2007

(54) DRAG-AND DROP DYNAMIC DISTRIBUTED OBJECT MODEL

(75) Inventor: Alan A. Katz, Johnson City, NY (US)

(73) Assignee: dBase, Inc., Vestal, NY (US)

( * ) Notice: Subject to any disclaimer, the term of this patent is extended or adjusted under 35 U.S.C. 154(b) by 589 days.

(21) Appl. No.: 10/313,904

(22) Filed: Dec. 6, 2002

(65) Prior Publication Data

US 2003/0120711 A1 Jun. 26, 2003

Related U.S. Application Data

(60) Provisional application No. 60/338,239, filed on Dec. 7, 2001.

(51) Int. Cl.
*G06F 9/45* (2006.01)

(52) U.S. Cl. .................................................. 717/108

(58) Field of Classification Search ................ 717/120, 717/108; 719/332, 316
See application file for complete search history.

(56) References Cited

U.S. PATENT DOCUMENTS

| | | | | |
|---|---|---|---|---|
| 5,857,197 | A * | 1/1999 | Mullins | 707/103 R |
| 5,875,335 | A | 2/1999 | Beard | |
| 5,978,585 | A | 11/1999 | Crelier | |
| 5,991,776 | A | 11/1999 | Bennett et al. | |
| 6,002,867 | A | 12/1999 | Jazdzewski | |
| 6,182,155 | B1 * | 1/2001 | Cheng et al. | 719/315 |
| 6,295,638 | B1 | 9/2001 | Brown et al. | |
| 6,298,477 | B1 | 10/2001 | Kessler | |
| 6,305,012 | B1 | 10/2001 | Beadle et al. | |
| 6,314,566 | B1 | 11/2001 | Arrouye et al. | |
| 6,324,686 | B1 | 11/2001 | Komatsu et al. | |
| 6,344,855 | B1 * | 2/2002 | Fisher et al. | 345/501 |
| 6,370,687 | B1 | 4/2002 | Shimura | |
| 6,446,078 | B1 | 9/2002 | Theodora et al. | |
| 6,484,214 | B1 * | 11/2002 | Sundermier | 719/332 |
| 6,496,865 | B1 * | 12/2002 | Sumsion et al. | 709/229 |
| 6,587,888 | B1 * | 7/2003 | Chieu et al. | 719/313 |
| 6,654,793 | B1 * | 11/2003 | Wollrath et al. | 709/217 |
| 6,859,931 | B1 * | 2/2005 | Cheyer et al. | 719/317 |
| 2002/0046304 | A1 * | 4/2002 | Fabri et al. | 709/331 |

FOREIGN PATENT DOCUMENTS

WO    WO 98/21671    * 5/1998

* cited by examiner

*Primary Examiner*—John Chavis
(74) *Attorney, Agent, or Firm*—Thomas R. FitzGerald, Esq.; Hiscock & Barclay, LLP

(57) ABSTRACT

An external object model is built into a comprehensive, drag-and-drop, dynamic, distributed object model, to offer its users lower total cost of ownership than do conventional user interface applications and application builders. A Windows® workstation user computer is provided with a quick, simple, easily-managed path to combinations of available applications on a network of systems, in such a way that the user can establish and exploit complex data relationships and software capabilities on the workstation without application installation, significant access effort, or specialized knowledge. Runtime binding prepares and links user forms and reports to application programs as desired, without preparatory steps. The definition and use of query objects to view concurrently multiple database tables offers the unique ability to combine fields from dissimilar database engines into a single view.

23 Claims, 34 Drawing Sheets

TA1 = DEO 1, 24, 32
TA2 = DEO 1-5, 22-25, 32-34

| Field | Name | Type | Width | Decimal | Index |
|---|---|---|---|---|---|
| 1 | CustNo | AutoIncrement | 4 | 0 | None |
| 2 | | Character | 10 | 0 | None |

:GuidedTour:customers.dbf - Table Designer

| Field | Name | Type | Width | Decimal | Index |
|---|---|---|---|---|---|
| 1 | CustNo | AutoIncrement | 4 | 0 | Ascend |
| 2 | LastName | Character | 20 | 0 | Ascend |
| 3 | FirstName | Character | 15 | 0 | None |
| 4 | Address | Character | 35 | 0 | None |
| 5 | City | Character | 20 | 0 | None |
| 6 | State | Character | 2 | 0 | None |
| 7 | Zip | Character | 10 | 0 | Ascend |
| 8 | SalesYTD | Numeric | 10 | 2 | None |

:GuidedTour:customers.dbf - Table Designer

| Field | Name | Type | Width | Decimal | Index |
|---|---|---|---|---|---|
| 1 | CustNo | Numeric | 10 | 0 | Ascend |
| 2 | InvNo | AutoIncrement | 4 | 0 | None |
| 3 | Date | Date | 8 | 0 | Ascend |
| 4 | Amount | Numeric | 10 | 2 | None |
| 5 | BalanceDue | Numeric | 10 | 2 | None |

:GuidedTour:invoices.dbf - Table Designer

| Data | Custom View | Current Report |

CUSTOMERS1

| CustNo | LastName | FirstName | Address | City | State | Zip | SalesYTD |
|---|---|---|---|---|---|---|---|
| 3 | Jones | Bill | 2135 Bay Avenue | Vestal | NY | 17555 | 33000.00 |
| 2 | Smith | Anne | 1980 Park Avenue | NY | NY | 18911 | 15000.00 |
| 1 | Taylor | Paul | 222 Sunrise Drive | Endwell | NY | 13760 | 10000.00 |

FIG. 12

| Data | Custom View | Current Report |

Current Report | No-Click Report ▼

Custom View:GUIDEDTOUR.DMD

Run 01/08/01 15 12

| LastName | FirstName | CustNo | Date |
|---|---|---|---|
| Amount | BalanceDue | | |
| Jones | Bill | 2 | 12/26/00 |
| 300 00 | 300.00 | | |
| Smith | Anne | 3 | 12/25/00 |
| | 300.00 | | |
| Taylor | Paul | 1 | 12/20/00 |
| 300 00 | 300 00 | | |
| Taylor | Paul | | |
| 500.00 | 100 00 | | |

Page 1

DRAG-AND DROP DYNAMIC DISTRIBUTED OBJECT MODEL

CROSS-REFERENCE TO RELATED APPLICATIONS

This claims the benefit of the priority date of U.S. Provisional patent application Ser. No. 60/338,239, filed Dec. 7, 2001.

FIELD OF INVENTION

This invention relates to computer programs providing an object model for software application development and use, and more specifically to programs providing such models for use with distributed software components.

DISCUSSION OF PRIOR ART

Distributed object models pervade the world of networked computing software. Distributed objects exist and operate across networks, available locally or remotely to users without concern for their physical location. This freedom from locality facilitates the rapid and accurate assembly of powerful distributed software applications using the full range of resources of entire computer networks.

Software object technology frees application and database developers from concerns with internal details of any applications to be integrated with their own. The developer who uses a software object has no direct knowledge of, or access to, the code or internal variables of that object. The only way to use an object is through its defined and specific interfaces. This characteristic of object technology is termed encapsulation.

Object technology enriches applications with the ability to create and use objects which are variations and combinations of classes of objects. The developer can create an instance of an object as a variation on a general class of objects. If the class of this instance of an object possesses a set of attributes, any object or subclass of this class will possess these attributes as well. This characteristic of object technology is termed inheritance. An object of a given class may be given individual attributes which override or augment the attributes of the class. This use of attributes provides for variation of treatment among objects of a class.

Finally, object technology provides applications and databases with the ability to use similar objects in different ways. In invoking the same method with object instances of two different classes, the developer can rely on behavior of the method in a manner consistent with the behavior of each object's class. The same request yields two different results, each appropriate to the object and its class. This characteristic of object technology is termed polymorphism.

Distributed objects that can be used by applications freely across networks, operating systems, and hardware are called components. Some types of components can also be used freely across languages and compilers. The use of components breaks down operational barriers to maximize the scope of the usefulness of software, without incurring software conversion or interface costs, and without compromising the software's integrity or reliability.

All of these aspects of distributed object technology rely on comprehensive and detailed definitions of all objects, their characteristics, and their interfaces. Two major models for the development, deployment and application of distributed objects are in current use: DCOM (Distributed Component Object Model), which is vendor-specific to Microsoft Corporation but widely used; and CORBA (Common Object Request Broker Architecture), which is the prime industry standard developed by the Object Management Group.

For the software developer, learning and applying either of these models is a challenging task. Object definitions number in the thousands, and appear in many languages. The challenge is doubled if both models must be used in one application. To use the models for actual applications, many files and table entries must be made in each system involved.

The complexity of the models and their actual application incurs a considerable cost that ultimately increases the total cost of ownership of the software. Application developers and users seek simpler models and methods with which to build and run their applications.

For the software maintainer, the tasks to be performed change rapidly with changing conditions of the maintainer's enterprise. The maintainer is often confronted with the need to organize and operate the software in patterns for which it was not originally designed. Since the original developers of the software are not present in every maintainer's environment, this need places the maintainer in the role of a developer. Maintainers must be able to change the ways the software operates, without incurring significant development costs and delays. Local software change, recompilation, and redeployment must be achievable without requiring significant effort on the part of the maintainer. In a network of systems and software, this is a difficult task.

Conventional software tools address these issues piecemeal, but provide no integrated solutions to the full range of the problems described above. Portable languages such as Java exist, and have been augmented with a component architecture called JavaBeans. DCOM and CORBA address components as well. All three require significant setup and maintenance effort, and significant learning effort, on the part of using organizations. Examples of solutions to pieces of the overall problem may be found in U.S. Pat. No. 5,978,585 (Crelier), Development System with Improved Methods for Recompiling Dependent Core Modules; U.S. Pat. No. 5,991,776 (Bennett), Database System with Improved Methods for Storing Free-Form Data Objects of Data Records; and U.S. Pat. No. 6,002,867 (Jazdzewski), Development System with Methods Providing Visual Form Inheritance.

The availability of a low-cost, easy-to-use distributed object model which is also powerful, reliable, flexible, and efficient would benefit all developers and users.

The following references supply detailed information on object and component technologies: The Essential Distributed Objects Survival Guide, Orfali, Harkey, Edwards, John Wiley & Sons, 1995; Object-Oriented Analysis and Design with Applications, $2^{nd}$ Ed., Grady Booch, Addison-Wesley, 1994; COM and CORBA(R) Side by Side: Architectures, Strategies, and Implementations, Jason Pritchard, Addison-Wesley, 1999.

SUMMARY

The invention provides a Windows workstation user with a quick, simple, easily-managed path to combinations of available applications on a network of systems, in such a way that the software developer can establish and exploit complex data relationships and software capabilities on the workstation without application installation, significant access effort, or specialized knowledge. The invention utilizes runtime binding to make software components usable by application programs as desired, without preparatory steps. The invention incorporates an external object model into a comprehensive, drag-and-drop, dynamic, distributed object model, to offer its users lower total cost of ownership than do conventional software development systems and application builders.

DESCRIPTION OF DRAWINGS

FIG. 12 shows the data display for the customers table.

FIG. 17 shows the invention's No-Click Report for a combined customer and invoice query.

FIG. 22 shows the Windows application's operating interface window.

DETAILED DESCRIPTION OF INVENTION

Figure 1:
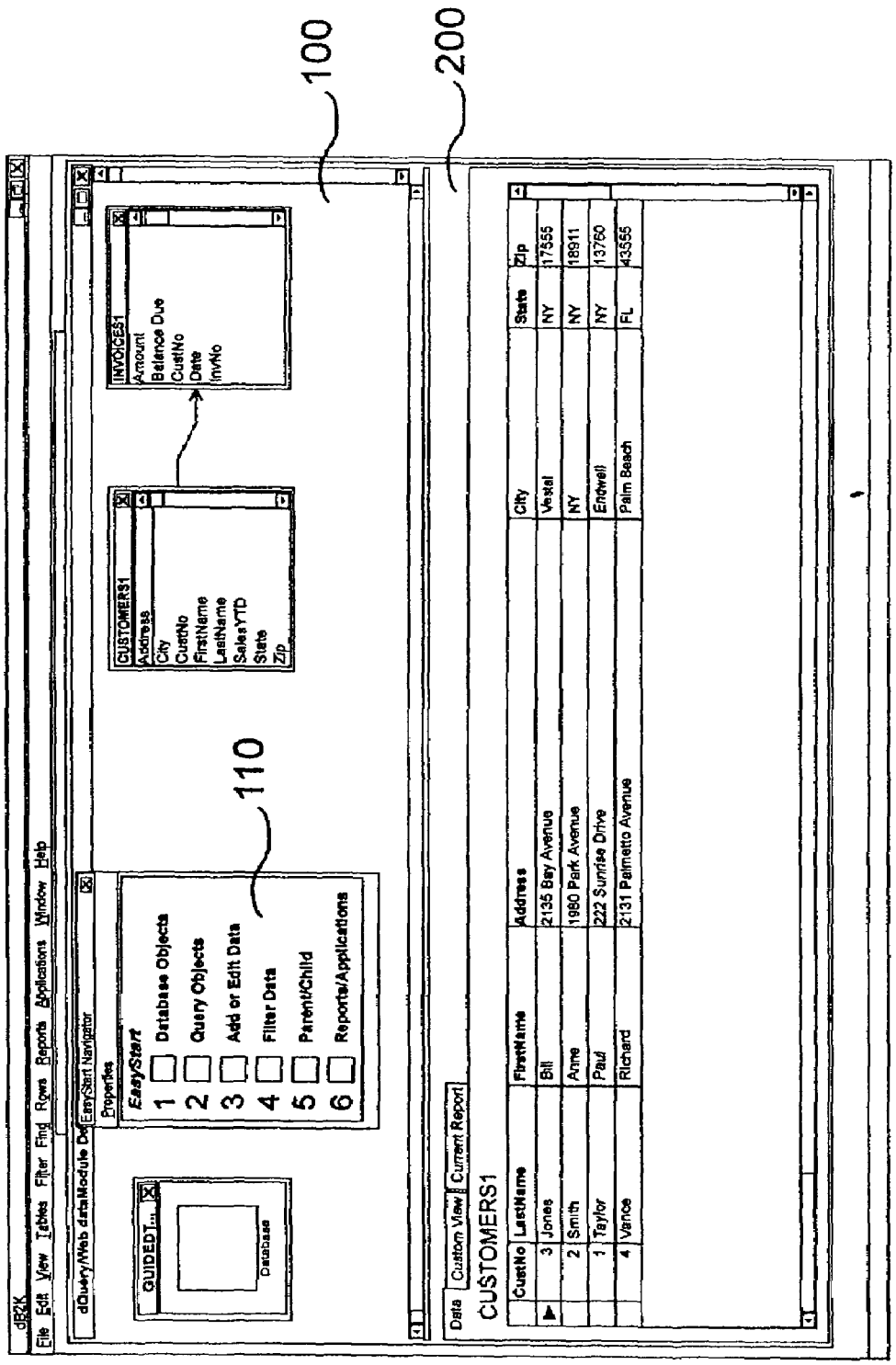
FIG. 1 shows the main opening screen for the invention.

The invention is made up of the following interacting components. In a first embodiment, the invention uses a set of peer-to-peer computers, each one further made up of one or more interconnected processors, one or more main memory subsystems, one or more mass storage subsystems, and one or more connections to wide area networks or local area networks, provide users with interface resources giving access to applications stored in the mass storage subsystems of any of the peer-to-peer computers.

In an alternative embodiment to the single set of peer-to-peer computers, the invention uses a pair of sets of computers. The first set of computers comprises one or more server computers, each one further made up of one or more interconnected processors, one or more main memory subsystems, one or more mass storage subsystems, and one or more connections to wide area networks or local area networks, providing access to applications stored in the mass storage subsystems of any of the server computers. The second of the pair of sets of computers comprises one or more client computers, each one further made up of one or more interconnected processors, one or more main memory subsystems, one or more mass storage subsystems, and one or more connections to the server computers via wide area networks or local area networks, providing users with interface resources to access the applications on the server computers.

Second, a shell (application) software program operating on each client computer for presenting a first form or menu to a user of the client computer, provides rapid and simple user connection to the user interface resources.

Third, a set of dynamic external object classes, stored on one or more server computers,, client computers, or peer-to-peer computers and operating on one or more client computers or peer-to-peer computers, for providing distributed object classes to a developer of software applications for a client computer or peer-to-peer computer.

Fourth, a compiler software program for compiling the distributed object classes into working executable objects, classes, methods, and attributes, based on the dynamic external object classes defined by thedeveloper.

Fifth, an interpreting software program (interpreter) converts compiled object code into machine code and resolves class inheritances, polymorphic behaviors, and encapsulation behaviors of the compiled executable objects, classes, methods, and attributes, across the client computers or the peer-to-peer computers, at the time of the application's request for invocation of the executable objects, classes, methods, and attributes.

Sixth, a means of providing an alias name for each database in the client and server computers to be accessed by an application program using the distributed objects.

DEO (Dynamic External Objects)

Dynamic distributed objects improve the way in which a software application is installed and updated on a user's machine. Instead of having a monolithic copy of a large program residing on each PC, the application accesses a number of compiled dynamic objects that reside on one or more computers in the network. Each user has a simple application program that lets him invoke the objects he needs to perform a task. In effect, the objects needed for the tasks of the application are combined on the fly as the user needs them. As such, the code for executing a given task is interpreted at the time the task is requested.

Each object contains a blueprint of the class for the object. Instances of the objects are created in the main memory of a user's computer. Each object can be independently updated on the computer where it resides. A user gets the latest version of the object when the user runs an application that invokes the object to carry out a task at his local machine.

The invention is akin to "just in time" assembly of a program. The user's machine is not burdened with a large, monolithic program residing on an ever-increasing hard drive. Instead a relatively thin application on the user's computer invokes the objects the application needs at a given time to achieve the task asked for by the user. The invention provides flexibility for users and, more importantly, for programmers. Now programmers can write new, thinner programs by using one or more existing objects and adding further objects to them to provide new tasks executable on a user's machine. Improvements or extensions of existing programs are more rapidly made and distributed by relieving the programmer from starting each new extension from scratch. For example, if a programmer writes a new email program his application can invoke the objects of an existing distributed object word processing program for providing the editing software for the new email program.

For example, assume a user wants to write a letter. He opens a thin word processor program installed on his machine. That program provides the user with a menu or graphical user interface that contains one or more pointers to objects that the application may use to create and edit a document.

That describes the operation at a high level. The objects of the invention have the capacity for inheritance. To resolve inheritance of characteristics from classes and superclasses, the invention's interpreter ascends the object class hierarchy, picking up missing characteristics from classes above the object in the hierarchy, and decends the hierarchy to override characteristics in higher classes with those of classes below, all to provide a current instance of an object. In other words one object can retrieve other, parental or superior objects, using the blueprints it needs to create an instance of the object during operation of an application. As such, a new algorithm for a spreadsheet can be rapidly added to the spreadsheet object that includes specific spreadsheet algorithms and the next time a user runs his spreadsheet program it will invoke the spreadsheet object with the new algorithm. Likewise, graphics or other resources can be given treatment as object characteristics. If an enterprise changes its name and logo (e.g. from Alpha to Omega) the graphics can be updated in the object for all documents and application will get new graphics with the updated name and logo.

The objects are dynamic and this means that they can be changed. They are not static or fixed. The objects are distributed. They do not have to reside on only one computer, but may be on many computers. There can be redundant objects but each redundant object is updated when its class is updated.

Figure 1A:
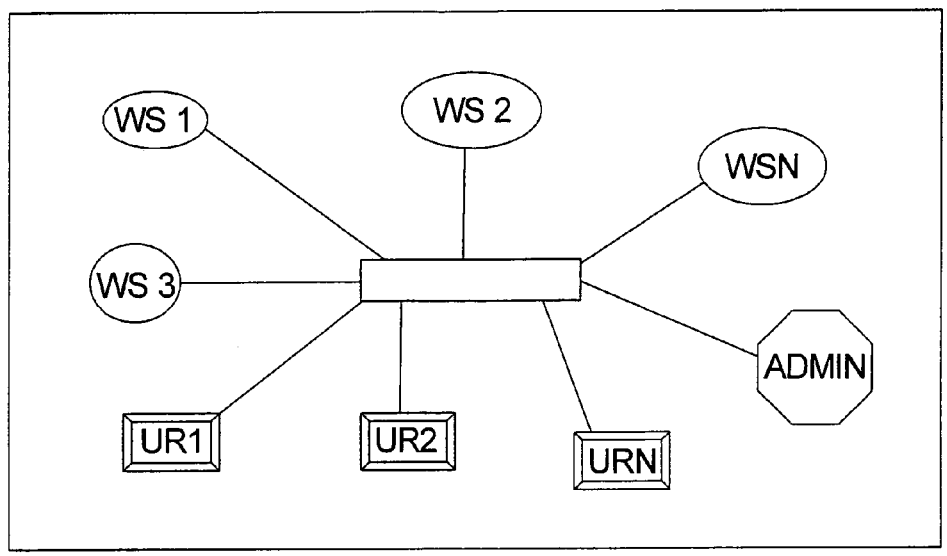
FIG. 1A shows the basic distributed system for dynamic external objects.
Figure 1A:
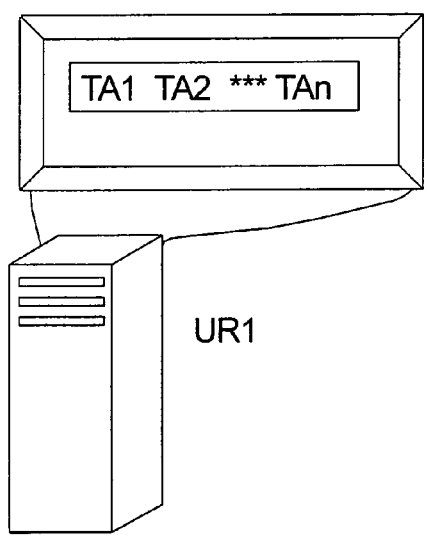

Turning to FIG. 1A, there is shown a network 100 that has a plurality of workstations WS1, WS2, WS3, WSn. Each workstation holds one or more dynamic, external, distributed objects (DEOs). For example, WS1 holds DEO 1–19, WS2 holds DEO 20–29, WS3 holds DEO 30–39 and WSN hold DEO n–n+x. A number of user computers (UR1, UR2 . . . URn) are connected to the network. The distinction between workstations and user computers is made for explaining the invention. Those skilled in the art understand that the network may be configured in a client-server manner or in a peer-to-peer manner. The invention does not depend on the architecture of the network. Those skilled in the art will also understand that the dynamic objects may reside on the user machines as well as on the network workstations. Thus, client-server, peer-to-peer and other networks can use the invention. The objects may reside on a private network, a public network (such as the Internet) of a combination of public and private networks.

Each user has one or more application programs that provide a menu or a graphical user interface (GUI) 120, such as the GUI shown in conventional Windows programs. An application program, such as a combined suite of word processor, spreadsheet and database programs, resides on the each user's computer. The objects for the application include a number of dynamic objects, DEO 1–DEO n+x. The DEOs are distributed on the network and reside in the mass storage space (hard drives) of either the workstations or the user machines. The user's application GUI 120 displays a number of tasks, TA1, TA2 . . . TAn. These tasks are shown in a menu form and may include sub-tasks shown on sub-menus in a conventional manner. The tasks may includes a variety of conventional operations such as creating a letter or a spreadsheet, editing the documents, spell checking, formatting, copying and pasting all or portions of one document to another, etc. The task TA1 requires certain objects to execute the task. These objects are DEOs 1, 24 and 32. When the user on machine UR1 selects a task such as the task TA1, the user's application points his machine to those objects that will execute the task. The objects are found on their resident machines WS1, WS2 and WS3, copied to the memory of the user's machine UR1, and an instance of the objects is created on the main, random access memory of the UR1 machine. The task TA1 is executed on the machine UR1. After execution of task TA1, the DEOs 1, 24 and 32 may be erased, cached or stored in mass memory on UR1. It is practical to cache the DEOs because the user is likely to perform the same task (creating a second word processing document) later. However, caching is not required for the invention.

Assume task T2 is a spreadsheet application that invokes DEOs 1–5, 22–25, and 32–34. When the user points his cursor to the task T2 his application program points to the machines on the network that hold the objects for the application. The objects are located and an instance of the spreadsheet object is created in the main memory of the UR1 machine and displayed to the user.

The user's machine has a compiler (if the user is a developer of software objects) and an interpreter (for any user). The compiler converts the developer's source code for the objects into object code. The interpreter converts the object code into machine language. Unlike other machines, those that operate the invention do not require a linking program to interconnect objects and the application program. The invention operates without linking because its interpreter can quickly resolve any object references in the compiled code, and it only runs the code it needs at any one time for any one task. Instances of the objects are interpreted on the fly. The compiled objects being interpreted are all relatively small, for example a few hundred kilobytes at the largest, and instances of these objects are rapidly created over most networks.

One or more administrative machines, A1, are coupled to the network 100. A programmer or a program administrator has high level privileges to access and change the DEOs on the workstations. For example, assume DEO1 is a graphic display for a document and includes the name, logo and a set of characteristic colors for the enterprise that creates the document. If the enterprise adopts a new name, changes its logo or its characteristic colors, the administrator accesses the dynamic object DEO1 and makes the desired changes. The next time a user accesses the object DEO1 for another document, the object is updated with the changes. In a like manner, assume DEO 34 is an object that contains algorithms that the spreadsheet can execute. If a new algorithm is added to the spreadsheet program the programmer updates DEO 34. The next time a user runs the spreadsheet program the new algorithm is part of the instance of the object that runs on his computer.

A key advantage of the invention is the development of new programs and program updates and the distribution of objects throughout the network. It is possible to dedicate different workstations to different objects or sets of objects so that, for example, the graphics for documents are on one workstations, the word processing operation are one another, the spreadsheet on a third and so on. Each of the objects can be updated at any time and as needed. As a result, the users always have the latest version of the program available to them via the distributed objects. The user's machines are relieved of the burden of storing large, monolithic programs such as integrated word processing, spreadsheets and databases. Instead, the user has a relatively thin application program that resides on his computer. The application program contains the location of objects needed to run the application. Those objects are located and run as needed at the time they are needed. The user's computer does not need to hold the objects before the application is run and does not need to retain the objects after the application is completed. The administrator no longer has to individually update each user machine with the latest version of a program because the dynamic objects have all the updates.

The invention creates and uses dynamic external objects (DEOs) to allow different parts of an application to exist and execute on different systems in one network, with no decision-making or intervention on the part of either the developer or the user, and no prior administration overhead. No entry in any system registry or filesystem is required.

The invention's Dynamic External Objects capability constitutes a unique technology that allows applications to share classes on server, client, and peer-to-peer computers across a local network, across a wide area network, or across the World Wide Web. Instead of linking forms, programs, classes and reports into a single executable that has to be manually installed on each workstation, the developer deploys a shell: a simple executable program of the invention that calls a first form or provides a starting menu from which an application can access forms and other objects created in the invention. The shell executable (application) program can be as simple a program as: do startup.prg where startup.prg can be a different ".pro" object in each directory from which the developer launches the application. The shell executable program may also be a program that builds a dynamic, context-sensitive menu for an appliucation user during the user's working session.

Dynamic External Objects can be visual, or they can be classes containing just "business rules" that process and post transactions or save and retrieve data. Each of these dynamic external objects may be shared across a network by all applications that call them.

For example, an application may have a customer form object that's used in a Customer Tracking application. This form object may also be used by a Contact Management program and an Accounts Receivable module. It is stored, for example, on a server computer. If the developer wants to change a few fields on the form or add a verification or calculation routine, the developer compiles the new form object and uses the Windows Explorer to drag it to the appropriate folder on the server computer. Every application is updated immediately. Any application invoking the form object on the server computer then retrieves the updated form object, interprets it to resolve all object characteristics, and uses it.

The invention's Dynamic External Objects capability offers the following advantages:

Updating objects requires only a simple drag-and-drop action on the part of the developer. No registration, no interface files, and no application server and required.

Although the objects sit on a network server, they run only on a user's workstation, reducing the load on the object's server dramatically and making efficient use of the local processing power sitting out on the network. This method of operation contrasts sharply with that of CORBA-style objects, which are registered and run on a server.

The same (non-visual) objects may be shared by both the user's LAN and the user's Web site.

Dynamic External Objects are very small and load quickly. They rarely exceed 140K in size and usually run in less than 100K.

The invention's Dynamic External Objects capability supports full inheritance. ActiveX/OCX objects do not support inheritance. Java objects inherit in CORBA, but the process is difficult and rarely used. In the invention, changing the layout of a superclass form lets every form in every application inherit those changes the next time they're called. A developer can rename a company or change a logo and propagate the change to all users by dragging and dropping a single file to the server.

Implementing Dynamic External Objects requires three steps:

Compiling source code.

Building a main launching form, or selecting a pre-built generic launching form.

Copying the compiled objects to a server.

Like Source Aliasing, which is dQuery/Web's means of providing a user with an alias name for each database in client and server computers, the invention has a mechanism to allow an application to find libraries of objects, making it much easier to share them across the network and across applications. This mechanism is based on an optional search list that is created using easy text changes in the application's .ini file. The invention searches objects as follows:

1. It looks in the .ini file to see if there's a series of search paths specified. It checks all the paths in the list looking for the object file requested by the application.
2. If it doesn't find the object using the search list, it looks in the "home" folder from which the application was launched.
3. If it still doesn't find it, it looks inside the application's .exe file.

As an illustration, assume the application has a library in which shared objects are to be stored. Assume also that the application is called "Myprog.exe" and runs from the c:\project1 folder. In the file Myprog.ini, the developer adds the following statements:

[ObjectPath]
objPath0=f:\mainlib
objPath1=h:\project1\images
objPath2=f:\myWeb.

These statements list the different paths to be searched to find object files to be used. Any of these paths may lead to any system in the network to which the user's system is connected. Any path might point to the user's own system, to a system in the same local area network as the user's system, or to a system in a wide area network connected to the network to which the user's system is connected.

The developer's code looks like:
set procedure to postingLib.cc additive

When the application executes, the invention will look first in f:\mainlib for postingLib.co, the executable form of postingLib.cc. If it finds postingLib.co, it will load that version into the user's system. If not, it looks in each of the remaining paths on the list until it finds a copy of the object file. If that fails, the invention will look in c:\project1 (the home directory). If that fails, the invention will look inside MyProg.exe.

In alternative embodiments, the invention can search additional places where objects are available for use. For example, the application's installer might store path names in the Windows Registry to be searched at some stage of the path search. The stage used for Registry searches might precede or follow the stage for use of the .ini file. Due to the size and complexity of the Windows Registry, and the time needed to access data within it, the use of the Registry is not considered as advantageous as the use of a simple file such as an .ini file.

Advantages of Dynamic External Objects (DEO)

Carrying out unanticipated updates: assume an invention application has already been shipped as a full-blown executable. A change is required to one object module. To do this, the developer copies the object file to the home directory of the application—the application will then use the new copy instead of the one built into the shipped executable. There is no need to redeploy the full application as is done in conventional application development products.

Reports: The developer can deploy reports or even let users create reports (using the invention) and add them to their applications by designing a report menu that checks the disk for files with an object-code report (.reo) extension. The developer lets the menu build itself from the file list. This exemplifies true dynamic objects—the application doesn't even know these objects exist until runtime. In effect, DEO supports real-time dynamic applications.

Technical Support: To try out some code or deploy a fix to a customer site or a remote branch office, the developer can send the object file via FTP to the remote server and the update is complete.

Remote Applications: With VPN support (or any method of mapping an Internet connection to a drive letter), the developer can run the invention's DEO applications remotely over the Internet. The invention includes resolution of URLs and IP addresses so that the user can access remote objects directly through TCP/IP without middleware support.

Distributed Objects: Objects can be in a single folder on a server, in various folders around a network, or duplicated in up to ten folders for fail-over. If one of the servers is down and an object is unavailable, the invention searches the next locations on the list until it finds one it can load. Objects can be located anywhere they can be found by the workstation.

dQuery/Web

The dQuery/Web tool is an example of an application constructed using the invention's capabilities, and illustrates the advantages of those capabilities. The dQuery/Web tool performs the following functions:

Creates and manages database tables and queries (for an application developer)

Performs data entry, editing and deletion in database (for an application user)

Performs data query from database (for an application user)

Connects with databases of different formats (for an application developer or user)

Creates, changes and deletes parent-child relationships between tables (for an application developer)

Filters database data (for an application user)

Searches database data (for an application user)

Summarizes database data (for an application user)

Performs global search and replacement of database data (for an application user)

Defines and displays custom views of database data (for an application developer or user)

Produces no-click reports (for an application user)

Customizes and produces reports (for an application developer or user)

Generates and executes one-click Windows applications (for an application developer or user)

Generates and executes one-click Web applications (for an application developer or user)

Deploys data module objects to the Web (for an application developer)

Deploys reports to the Web (for an application developer)

The dQuery/Web tool is a user interface. The dQuery/Web interface allows its user to act either as a developer of interface applications or a user of those interface applications, or in either role as needed at any stage of working with a set of databases. This ability to support both development and usage roles on the same interface screens, without requiring separate stages or phases of operation, constitutes a flexibility advantage of the invention. From this point forward, the term "user" is used to mean a person who is working either as a developer of database interfaces using the invention or as a user of those database interfaces.

The term "data module" as used here refers to an integrated collection of database connection, query, table, table link, filter, report, and application objects as defined and applied by the developer. Such an integrated collection of objects constitutes a database interface application.

The term "run-time binding", as used here, refers to the ability of an application to interconnect its objects, programs, and data dynamically, at the time the user wishes to interconnect them. This contrasts with "compile-time binding", in which objects, programs, and data are selected and linked at the time a program is compiled, and cannot be changed without recompilation; and with earlier forms of binding in which objects, programs, and data are interconnected at the time the application is written and tested, and cannot be changed even by recompilation. Run-time binding has great advantages of generality and flexibility, in that the user can change the objects, programs, and data being used simply by naming them when they are needed.

dQuery/Web's definition and use of query objects in its database interface lets the user combine fields from dissimilar database engines into a single view of data. For example, the user can take the first column in a custom view from an Oracle field in one database, join it with a second column from an SQL Server field in another database, and with a third column from a dBASE field in yet another database. Thanks to dQuery/Web's alias feature which provides user-customized path specification across multiple systems, the three databases may reside on any combination of servers in a network. Any user can use dQuery/Web to produce a single coherent view of the combined data of multiple distributed databases.

See FIG. 1. DQuery/Web's interface with the developer and user is a main screen display divided into a design surface 100 and a live data area 200. The design surface 100 in the top area of the main screen is used for modeling data—for creating query, database, session and stored procedure objects that describe the user's databases, tables, and queries, and the relationships between them. The design surface 100 is used by the application developer.

The live data area 200 is displayed with three tabs for access to different views and functions. The first tab of the live data area 200 is the Data tab. The Data tab is used for entering, editing and deleting application data. The data in this section of the screen changes in real-time to reflect the currently selected query object and any filters or parent-child relationships the user has set up for them. The second tab of the live data area is the Custom View tab. DQuery/Web allows the user to drag-and-drop fields from any combination of query objects to create a new, combined view of the user's data data. The third tab of the live data area is the Current Report tab, which displays either an automatic No-Click report, or any other report the user chooses to associate with this data module. The live data area is used by both the application developer and the user.

Figure 2:
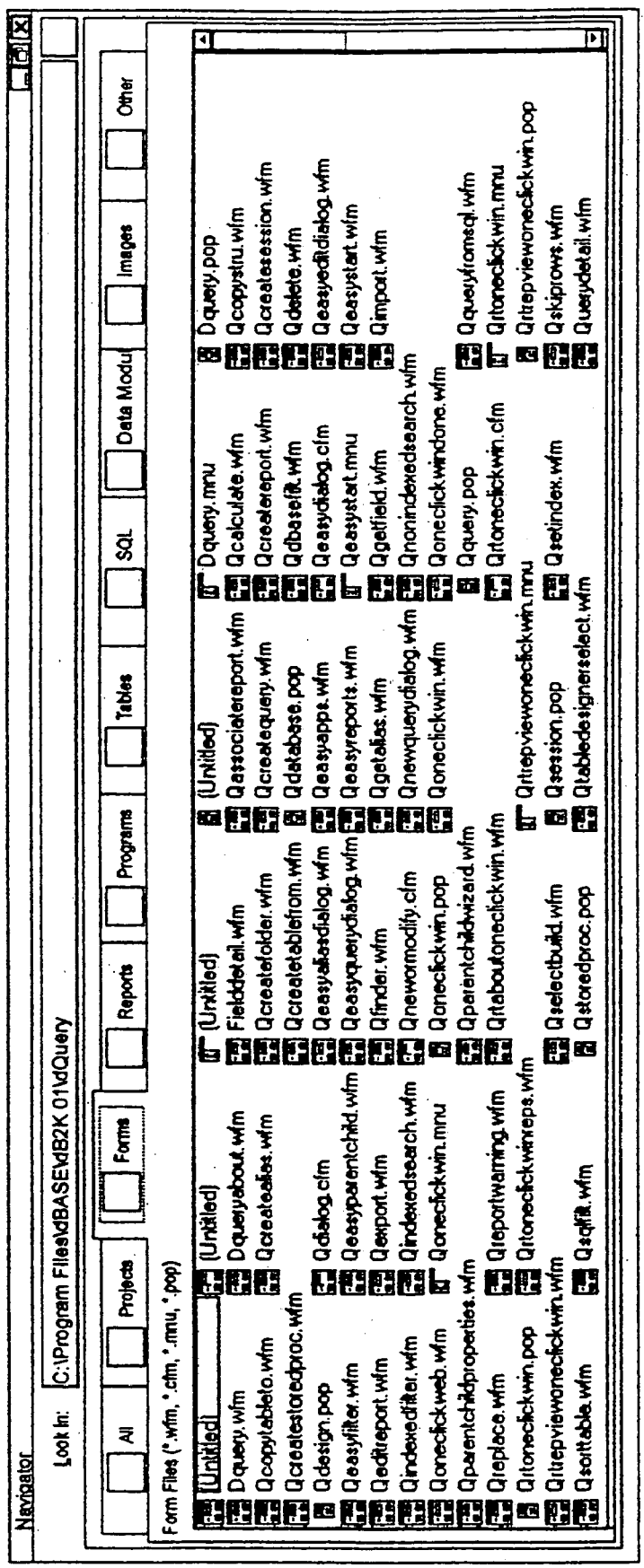
FIG. 2 shows the Navigator window.

DQuery/Web provides a navigational aid in the form of the Navigator window. See FIG. 2. The Navigator is a tool for opening files of all types used by dQuery/Web, and serves as the primary source for dragging existing tables and other files into dQuery/Web's view. The Navigator is called up from the "View" menu on most of dQuery/Web's screens or by right-clicking on many components and tools throughout the program. If the user clicks on a particular file displayed by the Navigator, dQuery/Web will bring up the appropriate tool and present to the user a new form, report, program or data module.

See FIG. 1. The EasyStart menu 110 appears on the design surface. The EasyStart menu is designed to assist the user in becoming familiar with dQuery/Web. It contains selections for creating data objects, creating query objects, adding or editing database data, filtering database data, creating parent-child relationships among data elements, and building reports and applications. These selections are also available on drop-down menus from the main menu bar.

The EasyStart window may be set to be "Always on top", displaying over other windows. To change the behavior of EasyStart, the user clicks on the "Properties" menu at the top of the EasyStart window. It may be changed to appear only when wanted, and to turn its help screens off and on. EasyStart can be turned back on at any time by right-clicking anywhere on dQuery/Web's main screen and selecting "EasyStart" from the popup menu.

DQuery/Web uses two kinds of menus. Main menus appear at the top of each screen. Pop-up or Context menus are brought up by right-clicking on a component. Pop-up menus supply only the options appropriate to the item the user clicks on. For example, right-clicking on the Design Surface allows the user to add new components. Right clicking on the Live Data Area gives the user options to navigate, add, save and delete rows of data. Almost every option that appears on a right-click menu also appears on the Main Menu or the Toolbar. Right-click menus save the user a lot of navigation across the expanse of dQuery/Web's main screen, and avoid searches in the Main menu to find the desired menu item.

DQuery/Web offers multiple ways of accomplishing a task. For example, to add a new Query data object to a data module, a user may perform one of the following actions:
  Right-click on the Design Surface
  Drag a table from the Navigator
  Drag a .SQL file from the Navigator
  Double click on "Untitled" on the Navigator Tables Tab
  Main Menu/Create Table
  Main Menu/New/Query From Table
  Main Menu/New/Query From SQL File
  EasyStart/Query (option 2)
  Click on a Query Toolbar Button DQuery/Web provides a Windows workstation user with a quick, simple, easily-managed path to any available database on a network of systems, in such a way that the user can establish and manipulate complex database relationships on the workstation without any database installation, access effort, or specialized knowledge. DQuery/Web utilizes runtime binding to prepare and link user forms and reports to database contents as required, without preparatory steps. DQuery/Web employs a database management language (DML) in an interpretive mode to carry out all operations directed by the user.

The invention features an external object model that, if used consistently, provides lower total cost of ownership than conventional user interface applications and application builders.

The Data Model

DQuery/Webevent-driven data model of the dQuery/Web application is implemented entirely in a handful of classes:
  Session
  Database
  Query (Database)
  StoredProc (Database)
  Rowset (Database)
  Field (Database)

This section describes the ways these classes fit together. It introduces each object and explains how its primary properties relate to the other objects.

Query Objects

Query objects are the center of the data model. In most cases, to access a table, a user must use a Query object. Alternatively, a user could use a StoredProc object that returns a rowset from an SQL database, or a DataModRef object that points to a data module containing the appropriate data access code, including at least a Query or StoredProc object. The Query object's main job is to house two important properties: SQL and rowset.

SQL Property

The SQL property's value is an SQL statement that describes the data to be obtained from the table. For example, in the statement "select * from BIOLIFE", the "*" means all the fields, and BIOLIFE is the name of the table, so that statement would retrieve all the fields from the BIOLIFE table.

The SQL statement specifies which tables to access, any tables to join, which fields to return, the sort order, and so on. This information is a commonly-accepted definition of the word query, but in dQuery/Web, SQL statements are only one of many properties of the Query Object.

SQL is a standard, portable language designed to be used in other language products to access databases. When a user uses the Form and Report wizards or drags a table from dQuery/Web's Navigator, dQuery/Web builds the required SQL statement to accomplish the directed objective. Once a table has been accessed by the SQL statement, the user can do almost anything desired with dQuery/Web's data objects, including navigating, searching, editing, adding, and deleting.

Although knowing SQL is useful for initially configuring data objects for the user's databases, once these data objects are complete and saved as custom components or in data modules, they can be reused without modification. This allows other users to create complete Windows database applications without knowing a word of SQL.

The Rowset Property

A Query object is activated when its active property is set to true. When this happens, the SQL statement in the sql property is executed. The SQL statement generates a result: a set of rows, or rowset. A rowset represents some or all the rows of a table or group of related tables.

Each Query object generates only one rowset, but the user can add multiple Query objects to a form to use multiple rowsets from the same table, or for different tables. Using multiple Query objects also allows the user to take advantage of dQuery/Web's built-in master-detail (parent-child) linking.

The Query object's rowset property refers to the Rowset object that represents the query's results.

Rowset Objects

While the user must use a Query object to get access to data, the Query object's resulting rowset must be used to do anything with the data. All navigation methods for getting around in tables depend on the query's rowset.

The Row Cursor and Navigation

The rowset maintains a row cursor that points to the current row in the rowset. When the Query object is first activated, the row cursor points to the first row in the rowset. The developer can get and store the current position by calling the rowset's bookmark( ) method.

To move the row cursor, the developer calls the rowset's navigation methods:
  next( ) moves the cursor a specified number of rows relative to its current position.
  first( ) goes to the first row in the rowset.
  last( ) moves to the last row.
  goto( ) uses the value returned by bookmark( ) to move back to that specific row.

Because each rowset maintains its own row cursor, the developer can open multiple queries—each of which has its own rowset—to access the same table and point to different rows simultaneously.

Rowset Modes

Once a Query object has been activated, its rowset is always in one of the following five modes (indicated by the rowset's state property):
  Browse mode, which allows navigation only.
  Edit mode, the default, which allows changes to the row.
  Append mode, in which the user can type new values for a row, and if the row is saved, a new row is created on disk.
  Filter mode, used to implement Filter-By-Form, in which the user types values into the form and dQuery/Web filters out all the rows that do not match.
  Locate mode, similar to Filter mode, except that it searches only for the first match, instead of setting a filter.

Rowset Events

A rowset has many events used to control and augment its methods. These events fall into two categories:
  can-events, so named because they all start with the word can—which are fired before the desired action to see whether an action is allowed to occur; and
  on-events, which fire after the action has successfully occurred.

Row Buffer

The rowset maintains a buffer for the current row. It contains all the values for all the fields in that row. The developer accesses the buffer by using the rowset's fields property, which refers to an array of Field objects.

Field Objects

The rowset's fields array contains a Field object for each field in the row. In addition to static information, such as the field's name and size, the most important property of a Field object is its value. Value Property A Field object's value property reflects the value of that field for the current row. It is automatically updated as the rowset's row cursor is moved from row to row. To change the value in the row buffer, the user assigns a value to the value property. If the row is saved, those changes are written to disk.

When referring to the contents of a field, the developer must use the value property. An example of correct usage is: this.form.rowset.fields["Species"].value. If the developer leaves out .value, viz.: this.form.rowset.fields["Species"], the reference is then to the Field object itself, which is intended principally for dataLinks, explained below.

Using DataLinks

Just as a Field object's value property is linked to the actual value in a table, a visual component on the form (such as a Select List or RadioButton) can be linked to a field object through the form component's dataLink property. This property is assigned a reference to the linked Field object. When connected in this way, the two objects are referred to as dataLinked.

As the rowset navigates from row to row, the Field object's value is updated, which in turn updates the component on the form. If a value is changed in the form component, it is reflected in the dataLinked Field object. From there, the change is saved to the table.

Database Objects

Database objects are one level up from Query objects in the object hierarchy. Database objects have three main functions:
  Database access
  Database-level security
  Database-level methods Accessing a Database A Database object is needed to access SQL databases, ODBC databases, and any other tables the user is accessing through a BDE (Borland Database Engine) alias. Before the user can use a Database object, the developer must set up BDE to access the database by using the BDE Administrator. To connect a Database object to a database, the user sets the Database object's databaseName property to the BDE alias for the database.

Database-level Security

Many SQL and ODBC databases require the user to log in to the database. The developer can preset the Database object's loginString property with a valid user name and password to log in to the database automatically. Because each Database object represents access to a database, a user can have multiple Database objects that are logged in as different users to the same database.

Database-level Methods

The Database object contains methods to perform database-level operations such as transaction logging and rollback, table copying, and re-indexing. Different database formats support each method to varying degrees. Before the user accesses the methods of a Database object, the Database object itself must be active. The methods of a Database object will not function properly when its active property is set to "false".

Default Database Object

To provide direct, built-in access to the BDE-standard table types (dBASE and Paradox), each session includes a default Database object that does not have a BDE alias. When the user creates a Query object, it is initially assigned to the default Database object. Thus, if the user is accessing dBASE or Paradox tables without an alias, a Database object is not used. If the user is accessing other table types, the Database object must be used.

Session Objects

At the top of the object hierarchy is the Session object. Each session represents a separate user. Each session contains one or more Database objects. A session always contains at least the default Database object, which supports direct access of dBASE and Paradox tables.

Session objects are important for dBASE and Paradox table security. Multiple users may be active concurrently. Each of these users may have an individual session, so that different users can be logged in with different levels of access, or they may share a single session, so that all users have the same level of access. For the Session object's security features to work, the session property of an active database object must be set to the session object.

A default Session object always exists whenever dQuery/Web is executed. In most cases, the default Session is the only one required. There is usually no need to add a Session component to forms or reports. DQuery/Web's App object has a property that points to the default session object and the default database object. Thus, when the user creates a Query object, the Query object is automatically assigned to both the default Session object and the default Database object.

The Session object has an event called onProgress that the developer can use to display progress information on database operations.

StoredProc Objects

The StoredProc object is used for calling a stored procedure in SQL databases. When the developer is calling a stored procedure, the StoredProc object takes the place of the Query object in the class hierarchy. The Stored Proc object is attached to a Database object that gives access to the SQL database, and it can result in a Rowset object that contains Field objects.

The stored procedure can:
  Return values, which are read from the params array
  Return a rowset, which is accessed through the rowset property, if the server supports this capability DataModRef Objects The DataModRef object points to preprogrammed data access components stored in a data module. If the developer maintains data access code in a data module, then the developer can use a DataModRef object to return rowsets in place of a Query or StoredProc component.

Data modules offer convenient reusability and easy maintenance of data access code. By storing custom or preset data access components in a data module, the developer can maintain them (change links to changing databases, for example). Following such maintenance, the developer can use only the DataModRef component (or custom class) to instantly implement the full set of current data access-components.

To set a DataModRef object to point to a data module, the developer sets its filename property to the path name of the data module. Web Applications Complexity Designing and building Web applications appears to be a complex process. DQuery/Web's Web Classes hide most of that complexity beneath dQuery/Web's easy-to-use and easy-to-learn methods. DQuery/Web's Web Wizards hide the complexities beneath a simple step-by-step interface.

Establishing and maintaining proper relationships among the Browser, the Web Server and the application (sometimes called an applet or servlet) the developer builds with dQuery/Web is a critical piece of the development process. Once the proper relationships are in place, dQuery/Web's Web applications are stable. The stability is due to dQuery/Web's use of standard Internet protocols and tools: Browsers, Web Servers, HTTP, TCP/IP, CGI and HTML.

Context of dQuery/Web's Web Application

The browser and the Web server dQuery/Web uses communicate with each other using http (HyperText Transfer Protocol), the protocol that powers the Browser and the Web. The developer doesn't need to know much about http or TCP/IP (the networking protocol of the Internet). Most of the developer's work is on the back side of the server, acting as the interface between the Web Server and the data being queried or updated.

The only significant exceptions to this placement of developer effort are the HTML page that starts the user's application and the response pages that chain the user's invention-generated applets together. Most often, the user's application starts with a static HTML page. That page has a form on it, and that form has "form components", such as Text controls (similar to dQuery/Web's Entryfields), Selects (Comboboxes), Lists (Listboxes), Checkboxes, Radiobuttons, Text Areas (Editors) and Buttons (Pushbuttons). There are no Grid, Notebook or container controls.

These HTML controls have name and value properties, just as dQuery/Web's components do, e.g.: <INPUT TYPE="TEXT" NAME="FirstName" Value="Alan">. Fields have names and values. Field objects have names and values. Associative Arrays (see below) have names (keys) and values. This almost-universal implementation of name/value pairs allows dQuery/Web's Web Classes to make the process of retrieving, processing and storing data invisible to the user, thereby simplifying the development of Web applications.

When a developer designs an HTML startup or data-entry form, the developer must apply the same standards needed for dQuery/Web's Windows application: name the controls appropriately, size them correctly for the data to be entered, default them to obvious values and position them for ease of use and clarity of data entry.

On the "Back Side" of the Web Server

The invention is a sophisticated application and database development tool, and most Web applications are database applications. In the case of dQuery/Web, once dQuery/Web's applet is launched and the user's data is passed along by the Web Server, there are six things the developer must do:

1) Retrieve The Incoming Data—When the Web Server launches the developer's server-side application, it runs it as a child process, passing along a copy of its environment plus the data it picked up from the user's HTML form. It sends its data either through the environment, a command-line parameter or as a data stream. DQuery/Web's applications can read or write a stream of bytes to and from another application. A byte stream is just like a text file except that the text flows in real time and doesn't get saved to disk. The developer can send data through a pipe from parent to child and child to parent without the overhead of creating, finding, reading and writing disk files. DQuery/Web's Web Classes (see below) determine how the data was sent, how it's supposed to be received and then go out and get it.

2) Format The Incoming Data—The data that gets read into the user's application is received in a garbled form of NameNalue pairs. Like an .ini file, dQuery/Web's "Set" commands, or DOS environment commands (PATH=), these pairs must be parsed by the user's application and converted to invention-readable data.

For example, the incoming data stream may look something like this:
FIRSTNAME=Alan&LASTNAME=Katz&ADDRESS= 102+Main+St%21

In the line above, the ampersand is the delimiter between pairs, the plus signs are keyboard "spaces", the % indicates punctuation or special characters in Hex format. The left side of the equal sign is the name of the control on the HTML page, the right side is the data the user typed into the control. DQuery/Web's simple Web Class method called oemFormat( ) converts the above incoming data stream into dQuery/Web's form of data and stores it to an Associative Array:
oCGI["FIRSTNAME"]="Alan"
oCGI["LASTNAME"]="Katz"
oCGI["ADDRESS"]="102 Main St."

Note: DQuery/Web's Web Classes are made up primarily of the array in which the incoming data is stored. Derived from dQuery/Web's built-in AssocArray class (see below), the Web Classes allow the developer to store the data and the methods that act on that data in the same object.

3) Validate and Manipulate the Data—The data retrieved from the Browser, stored as shown above in the developer's AssocArray as text, must be validated. In the simplest cases, this might mean looking for missing data and returning an error page to the user. In more involved cases, it might mean performing more elaborate validation, such as checking a user's ID and password, or a customer's CustNo, or performing calculations or other data manipulation.

DQuery/Web's Web Classes let the developer pass an array instead of a string to the sorryPage( ) method (dQuery/Web's HTML equivalent of MsgBox( ) or Alert( ) in other languages, returning an error page to the user). The developer can batch all the errors instead of requiring the applet user to submit a page for one error at a time. This is form-level validation instead of field-level validation. Although a developer can do rudimentary validation using client-side JavaScript, all the context-related validation happens on the server after the form has been submitted.

4) Store Or Retrieve The Data—The methods of dQuery/Web's Web Classes let the developer store the incoming data to a table or send table data back to the applet user with little more code than that which instantiates a Query object, reads data, and writes data. This simplicity is made possible by naming the form controls on the HTML page with names identical to the table fields they're going to or coming from, including matching case. The AssocArray class is case-sensitive. The Windows GUI is not used.

5) Build (And Send) a Response Page—For each applet the developer writes using dQuery/Web, an HTML response page must be developed and streamed back to the applet user. This response page gets sent back to the user to either allow forward motion through the application or acknowledge input data.

Typical Response pages include:
Thank You page
Confirmation of Order
Acknowledgement of Data Received
Another data-entry page (multi-page applications)
A second copy of the page that launched the applet.
A menu page to continue surfing the site
The "Checkout" page for an Online Store To get data back to the Web Server, the developer uses the Puts( ) method of dQuery/Web's built-in File Class.

6) Clean Up and Quit—Even though dQuery/Web's Quit command should close down everything and restore the user's resources, the developer should clean up the created classes and queries. A Web applet may be run thousands of times a day. A loss in each execution of a small amount of system resource can accumulate into a drastic impact on the user's Web server.

The Web Classes
DQuery/Web's Web classes are a collection of classes written in the invention's supporting language (dBL) and based on the AssocArray class. The Web classes perform the following functions:
Connect to the Web Server
Retrieve data from the Web Server
Format the data received and store it in the AssocArray
Read data from tables into the AssocArray
Save data from the AssocArray back to tables or DataModules
Stream the response page back to the Web Server
Pass through data for "chained applications"
Report back user and data errors (Sorry!) to the Web Server
Report back system errors (An Error Ocurred . . . ) to the Web Server
Clear UserID and Password access.
Send Mail Through Windows NT
By employing and subclassing dQuery/Web's Web Classes, the developer can build hand-coded Web sites, including e-Commerce sites, in very little time by comparison with conventional methods. The errorpage( ) and sorryPage( ) methods provide browser-based debugging aids for this development process.

DQuery/Web's Web Wizards include three main source files: WebClass.cc, for the main class; WebPWClass.cc, for a password-enabled subclass; and WebIISMailClass.cc, for a class to send mail through Windows NT. The Web Wizards also include a utility, HTMLtoPRG, that converts HTML code generated by the popular HTML authoring tools to dQuery/Web's source code. DQuery/Web's Web Wizards employ the Web classes to generate data-entry, query and publishing applications without writing code. They generate HTML, invention source code, and invention executables.

How Do The Web Classes Work?

Associative Arrays
Very few languages have array classes. Normally, an array is a primitive—a basic data type, not a class. The disadvantage of a primitive is that the developer can't define the properties and behaviors of a primitive internally. The developer must act on it from outside. Conversely, any array class created in dQuery/Web may contain all the data and methods needed to implement the applet's purpose.

Instead of accessing AssocArray class elements with a numeric index (as is done in a normal Array class), the developer accesses its elements using a text string. This approach is well-known to developers familiar with script languages such as awk. The similarity of usage in CGI, dQuery/Web's tables, and dQuery/Web's AssocArray class simplifies dQuery/Web's workings. Here are comparable accesses in all three forms:

| CGI: | FirstName = "Alan" |
|---|---|
| Table: | fields["FirstName"] = "Alan" |
| AssocArray: | this["FirstName"] = "Alan" |

The congruence of name/value pairs, coupled with the ability of an AssocArray to embed its data and manage itself, urged creation of dQuery/Web's Web Classes. The fact that all three elements (CGI, tables and AssocArrays) are essentially different implementations of the same basic data structure enabled dQuery/Web's design of Web Classes wrapped up in a subclass of AssocArray. That custom AssocArray subclass is named CGISession. It is central to dQuery/Web's Web Classes.

If the developer names the HTML controls exactly the same as the fieldnames of the corresponding table (including case sensitivity) dQuery/Web's CGISession AssocArray imports the user's data from the Web Server, imports the user's data from a database table, exports the user's data to a database table, and export's the user's data to a CGI response page. In effect, the CGISession acts as a direct intermediary between the Web and the user's tables with little developer effort, and without user involvement.

CGISession also manages the connection to the Web Server, handles both input and output data streams, clears passwords, sends mail, streams HTML and passes data through from page to page.

The tasks remaining for the developer: Validate the incoming data, and specify the HTML to be sent back in response. DQuery/Web's Web Classes handle all other tasks.

The Methods of the Web Classes

Here is a categorized list of dQuery/Web's methods for the Web classes.

Input Methods:

| Connect() | WebClass.cc Connects to Web Server and gets data |
|---|---|
| LoadArrayFrom CGI() | WebClass.cc Internal - Loads CGI data, converts to Name/Value pairs |
| OEMFormat() | WebClass.cc Internal - Converts ANSI to OEM |

Data Methods:

| LoadArrayFrom Fields() | WebClass.cc Loads table data into array |
|---|---|
| LoadFieldsFromArray() | WebClass.cc Loads array data into table row |
| LoadDataModuleFrom Array() | WebClass.cc Loads array data into dataModule |

Output methods:

| StreamHeader() | WebClass.cc Streams out CGI Header code |
|---|---|
| StreamBody() | WebClass.cc Streams out HTML body code |
| StreamFooter() | WebClass.cc Streams out HTML closing |
| PassDataThrough() | WebClass.cc Embeds all data in new page as Hiddens |

-continued

| Error Recovery: | |
|---|---|
| SorryPage() | WebClass.cc Streams out user error response page |
| ErrorPage() | WebClass.cc Streams out system error response page |
| Password Clearing: | |
| CheckPassword() | WebPWClass.cc Checks UserID and Password |
| eMail for Microsoft IIS: | |
| PostForPickup() | WebIISMailClass.cc Sends mail via Windows NT |

Subclassing

The single most powerful feature of dQuery/Web is its use of fully object-oriented language advantages. Classes deliver critical productivity and quality improvements. The most productive feature of classes is inheritance. Inheritance gives the developer all the tested and debugged functionality of the base class, plus the improvements and customizations the user incorporates in the user's own subclasses. DQuery/Web provides extensive, useful, and clean functionality in the core Web classes. The developer extends their usefulness through subclassing.

The developer does not modify the classes provided in dQuery/Web. One of the other advantages of inheritance is the ability to inherit fixes and improvements from the base class. If the developer fixes, modifies or deletes code from a base class, the changes will have to be made again in each new version of dQuery/Web developed.

Developers may customize the response page. For that reason, dQuery/Web's default streamBody( ) method has been designed without special features. To customize response pages, the developer declares a subclass of CGISession in a source file. This action overrides the default streamBody( ) method with the developer's version.

Customization may be performed more than one level down from the base class, with inherited characteristics passing through from the base class when no overrides are specified.

Class CGISession: DQuery/Web's base Web Class. It is the superclass from which all the other Web classes are inherited.

Class signupCGISession: A custom class built specifically to be used to derive every applet in an example conference signup application. It includes general customizations that apply to all applets, such as errorpage( ) and sorryPage( ). This first-level subclass of CGI Session gives a uniform "look and feel" to all the applets using it. It is a template or schema, and an inherited and inheritable class.

Base Class sorryPage( ) / Subclass signUpCGISession sorrypage( ) / Class Signup: This is the lowest-level class in a Conference Signup sample. Inherited from signUpCGISession, it's used strictly to customize the response page for each individual applet. This one never gets subclassed, so the developer may declare a new subclass with the same name at the bottom of each and every applet source file.

The "Signup" class returns the CGI response page for the particular applet, by overriding the streamBody( ) method inherited from signUpCGISession. The developer declares a method (function) with the same name as the original, and the new method replaces the inherited version without further action. Using this three-level hierarchy allows the developer to deliver consistent applications with limited use of hand-coding.

DQuery/Web provides a utility, HTMLtoPRG, to poke generated HTML code into the dQuery/Web application. If the user subclasses some generation of CGISession somewhere in the applet source, HTMLtoPRG will produce the exact syntax required The WebPWClass The WebPWClass is a subclass of CGIPWSession in WebClass.cc that adds password validation to the core class functionality. This is particularly useful for private Internet/Intranet sites, membership sites or business-to-business e-Commerce sites.

Web Classes and Reports

DQuery/Web provides a set of classes not used in conventional development packages: the Report Classes. DQuery/Web's reports can be run directly from a browser, and displayed immediately on the Web, without the generation of any hand code. This capability derives from a novel option in the Output property of the Report Class that signals a CGI response. The developer sets the response property to run the report directly on the Web. The report may be tested in Windows by setting the FileName property to a desired file name. The report will be streamed out to a file of that name in HTML format. In dQuery/Web's design environment, there is no StdIn pipe set up during execution, so that dQuery/Web sends the report output to a file instead. The developer compiles and builds the report to an executable file, and the report is then ready to be called from the browser.

When the report renders, it connects via StdOut to the Web server, streams out its own CGI header, outputs its text objects as HTML and quits when done.

Sending Mail

The best mail solutions are designed to run outside of dQuery/Web's applets. That way, the applets maintain dQuery/Web's performance and resulting scalability advantages. The eMail operation then works at its own pace, uncoupled from the browser, the Web server and dQuery/Web's applet. Two designs work well: a text file interface and a database interface.

Mail Text File Interface

The user drops a properly formatted text file in the appropriate folder and the Microsoft Internet Information Server sends the text file as mail.

There are two drawbacks to this method of posting mail. First, the user must be using Windows NT Server and running Microsoft Internet Information Server as the Web server. Second, there is no feedback (except, of course for the NT logs) to confirm or report an error in the mail send. The user doesn't know if the mail has or has not been sent without checking the logs.

Mail Database Interface

The Message Server included in dQuery/Web is a full-time application that runs either on a Web server, or preferably, on another dedicated computer. It runs as a background task even on a Windows 98 computer as long as it has access to dQuery/Web's tables over the network.

This is a polling application that continually re-queries a specified table to see if any new information rows have been added. It then uses the information in each new row to compose and send an electronic mail message to one or more addresses specified either in the same table or in another table in the same or another database.

This solution generates its own HTML logs that can be accessed remotely, it is highly scalable, and it updates the mail table to confirm when mail is sent. It doesn't require Windows NT or IIS.

The Message Server

The MessageServer is a polling application that runs on any computer on a network that has access both to an eMail server and to the tables the user wishes to poll. This application scales up by adding another machine running the MessageServer, which doubles the access to data coming in over the Web or from dQuery/Web's Windows applications.

The Message Server is usable for any of the following purposes (among others):
1) eMail confirmation for online orders.
2) Sharing remote data (send it as text in eMail, parse the incoming eMail back to data).
3) Sending new leads out to a field sales force.
4) Sending orders (or purchase orders) to remote branches.
5) Distributing eMail out to a database-based eMail list.

Message Server Advantages

The advantage to dQuery/Web's Message Server is that it uses a database to accomplish its tasks. That means it can update rows directly as mail is sent, optionally marking rows that have been sent with the date and time. Furthermore, it is, in many ways, failsafe. If something goes wrong with the Internet connection, the network or the database engine, the next time the MessageServer starts up, it begins where it left off.

What Are the Web Wizards?

DQuery/Web's three Web Wizards, packaged as a single multi-option Wizard-style program (WebWizard.prg), help the developer write Web applications. The Wizards walk the user, step-by-step, through the process of selecting the data, folders and design elements needed to create highly interactive Web applications. When the user clicks "finish", the Wizards generate the source code, HTML pages and compiled .EXE files required to complete the project. The only items required from the user are the tables, reports, images or data modules that are to be included in the final application.

What the Wizards Do

There are three Web Wizards: Data Entry, Query and Response, and Publish.

The Data-Entry Web Wizard

The Data-Entry Web Wizard helps the user create an application in which a remote user can enter data into database tables using a Browser. Some possible uses of the Data Entry Wizard:
Salespersons reporting from the field.
Order Gathering
Name and Address Gathering
Help Desk
Online Store
Bug Reporting The Query and Response Web Wizard The Query and Response Web Wizard helps the user create an application wherein the user enters or selects criteria from a Web Page and receives a report in response. The Web Wizards support a drill-down query—the user may refine his or her query by selecting an item on the first report, which "drills down" into detail in a second report. A user may, for example, start with a report of categories, each displayed as a link embedded by the Web Wizards. The user clicks on the category, and the link in turn calls a new report that lists the inventory items in that category. Some possible uses of the Query and Response Wizard:

Customer Account Queries
    Inventory Lookups
    Product Line Lookups
    Remote Sales Queries
    Shipping Status Queries The Publish Web Wizard The Publish Web Wizard helps the user post static and live reports on a Web site or Intranet. Static reports are run and saved each time the user runs the Wizard. An HTML page is generated on the user's Web site that doesn't change until the Wizard is run again. Live reports, on the other hand, are run on the Web Server each time the user accesses the report. Each time a live report is run, it returns live, up-to-the-minute data to the Browser for display. Typical Publish Web Wizard reports might be:

Price Lists
    Product Lists
    Customer Lists
    Schedules of Events
    To-Do Lists DataModules and Queries Paths The Data-Entry Web Wizards are based, in large part, on DataModule and Query objects. If a table is used as a datasource, the Data-Entry Wizard creates its own Query object for opening and updating the table. DQuery/Web's Query-and-Response and Publish Wizards use reports (.rep files), which also contain either Query or DataModule objects.

The Web Wizards compile and build Query and DataModule objects into a generated application. Since the finished application may not be running from the same drive, folder, or even computer on which they were developed, the user must set the paths used in the SQL statements of the Query objects. The Web application generated by the Web Wizards must be able to find all data sources from the Web Server's CGI folder.

For example, assume a Web applet is developed on a workstation, and the data is on the same server from which the application will run. At the developer's workstation, the appropriate SQL statement may be something like:

Select * from "F:\Mydata\Mytable.dbf"

However, drive "F" on the workstation may actually be drive "C" on the Server, in which case the SQL statement needs to be:

Select * from "C:\Mydata\Mytable.dbf"

There are three ways in which the correct paths can be specified:

The developer sets up a temporary folder on the development machine with the same tables to be using on the Server and the same path. In the above example, the developer sets up a C:\Mydata\Mytable folder on the workstation.

The developer hand recodes the .Rep or .DMD files after the wizard is done and then recompiles and regenerates the application.

The developer uses only DataModules for all reports and Wizards and includes a Database object in each that points to an Alias in the Borland Database Engine. This approach eliminates path concerns both in development and at runtime.

Deploying Web Applications

DQuery/Web's runtime code does not require any system setup on the part of ISPs or administrators, except for the BDE (Borland database engine), which is well known to and accepted by ISP administrators. DQuery/Web's runtime can be installed without any Windows registry entries. DQuery/Web goes through a search path in looking for its parts as follows:

1) Look in the current folder
2) Look in the executable's home folder
3) Look in the Windows System (WinNT System32) folder and only if all three of those fail,
4) Look in the Windows registry.

Only the following files are required to run dQuery/Web's Web applications on any given server or client computer:
    dB2K7run.exe
    dB2K7000n.dll (where "n" is the local language code used by dQuery/Web)

The user can copy these files right into a runtime (CGI) folder and never install dQuery/Web itself (apart from the runtime) on the server.

Performance Enhancement

DQuery/Web incorporates a program called dB2KFast.exe, which pre-loads dQuery/Web's programs to save loading latency when an applet runs.

Operation of dQuery/Web

DQuery/Web's processing is driven by the user's interactions with the screen interface. The following sections describe the principal categories of action for a user creating a data module and its contents for a customers-and-invoices database, including the creation of the database itself. The examples shown illustrate the key functions and components of dQuery/Web, and their composition into a coherent and unique whole.

Opening, Saving and Creating a New Data Module

A data module is a bundle of interrelated objects that define and implement a user interface to some data distributed among one or more databases. The types of interrelated objects in a data module include database objects and their aliases, query objects, report objects, and custom views of data.

A user may create a new data module, or edit an existing data module, using dQuery/Web's main screen. See FIG. 1. Every time the user opens dQuery/Web, dQuery/Web displays a new data module for editing and use. Alternatively, the user can obtain a new data module by double-clicking on "Untitled" in the data module tab of the Navigator, or by selecting File/New/Datamodule from the dQuery/Web Main Menu.

To open an existing data module, the user selects the dQuery/Web Main Menu, and then clicks File/New/DataModule or else double-clicks on the desired data module displayed under the dataModule tab of the Navigator.

Saving a data module is accomplished by clicking "File/Save" or "File/Save as" from the dQuery/Web Main Menu. Alternatively, the user can select the "Save" toolbar button.

For each of its toolbar buttons, dQuery/Web provides a "Speedtip" that defines the operation performed by that button. Leaving the mouse over a toolbar button for approximately one half second causes the tip text to appear.

Creating a Database Object

DQuery/Web uses database objects to represent the user's database: the collection of tables that will define the information the user wishes to get from the databases in the user's network. In SQL databases, a database is contained in a file. In other database engines, such as dBASE, Paradox, FoxPro and Advantage, the database is a folder containing related tables of data, each of which is stored in a file. DQuery/Web uses the database object to link the user's data to applications, reports and dQuery/Web itself. Although a database object is not strictly required for non-SQL tables, it is recommended that the user always starts by defining a database object for the database to be used.

For this description, EasyStart is used to add components to a new data module. If EasyStart is not currently displayed on the screen, the user may right-click on the Design Surface and then click on EasyStart to make it appear.

Aliases

The database object is based on an alias. An alias is a specialized path statement that tells dQuery/Web where to find the user's data. Foremost among its advantages, dQuery/Web's alias approach offers portability. Each machine on the user's network may use a different drive letter to find shared data. Using an alias allows the user to point to the same location regardless of the path required to get there. A second advantage of aliases is that they allow the user to move database data from one place to another in the network without having to rebuild the application. For instance, moving data from drive H to drive L, which would normally require recoding or re-editing of application code, requires only a change of the alias to point to the new drive.

Selection of an existing alias, or creation of a new one, will cause dQuery/Web to generate a database object without user intervention. DQuery/Web provides for choosing aliases for many databases including dBASE, Paradox, FoxPro, ODBC, Interbase, SQL Server, Informix, Oracle, Sybase, DB2, and Access. This description assumes that the dBASE alias is to be used.

Figure 3:
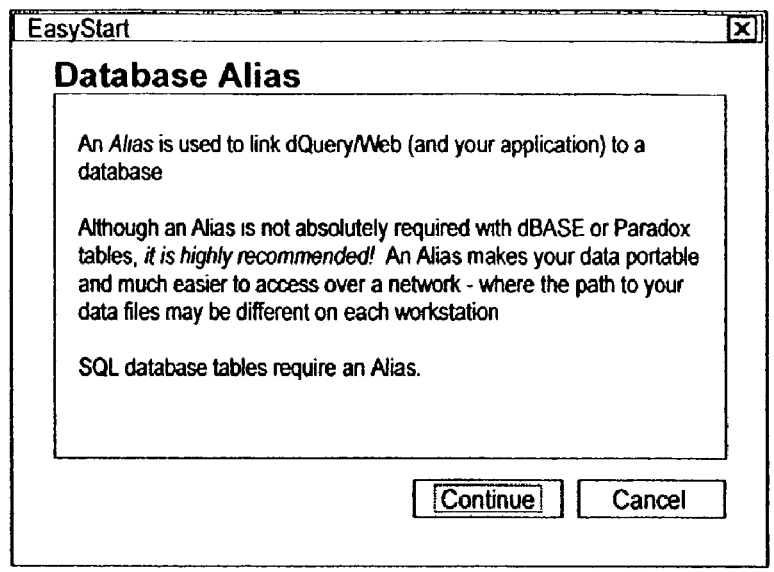
FIG. 3 shows the database alias prompt window.
Figure 4:
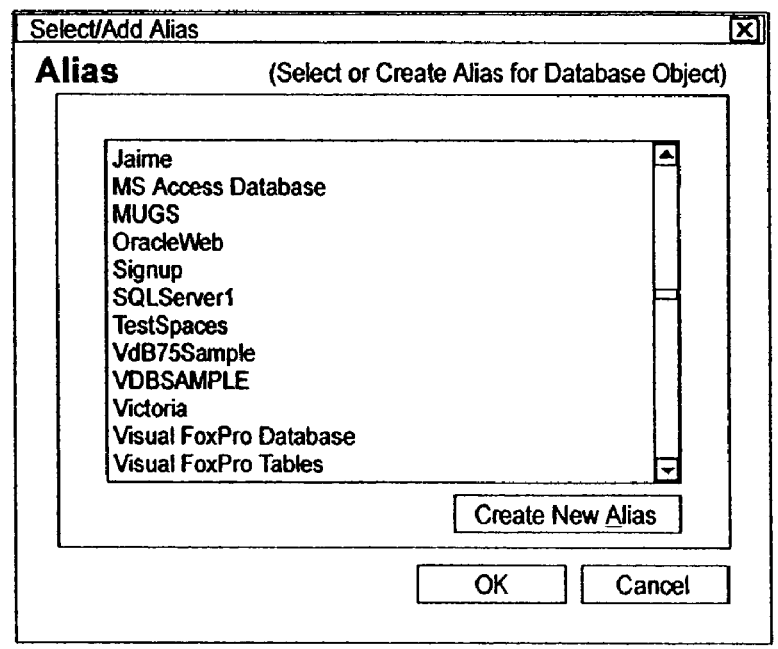
FIG. 4 shows the database alias selection/creation window.

The user begins creating a database object by clicking on the "Database Objects" listed as shown on the EasyStart Navigator. DQuery/Web displays a help dialog like that shown in FIG. 3. These informative help dialogs will often appear when using various tools in dQuery/Web. FIG. 4 shows the list of aliases available.

Figure 5:
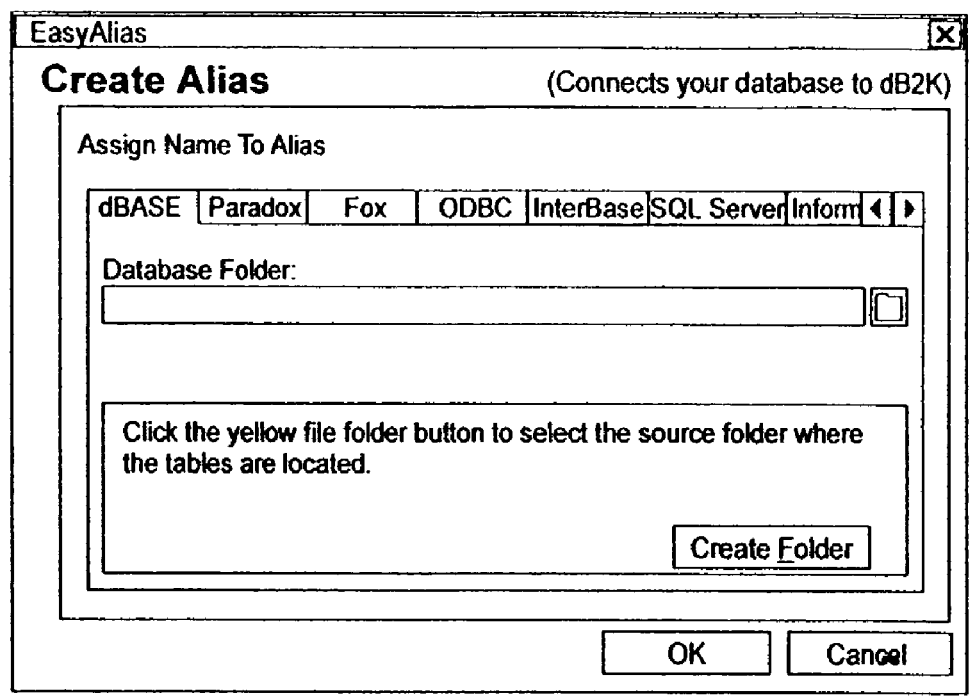
FIG. 5 shows the database alias creation window.

If the database the user wishes to connect to is not already on the Alias list, the user clicks on the "Create New Alias" button. DQuery/Web displays the "Create Alias" dialogue. See FIG. 5. The user then enters the name of the Alias in the first field shown, and then clicks "Create Folder".

Some database engines use a folder to identify the location of the user's data. Others, such as SQL server, Informix, Oracle, Sybase, and Interbase access the user's tables through a single file or connection. DQuery/Web asks the user for the appropriate information depending upon which database engine the user selects. For this example of operation, the user has selected dBASE, and consequently dBASE tables are to be shown. Therefore the user must add a new folder in which to organize table data. Here the table data are examples of customers and invoices in a business database.

Figure 6:
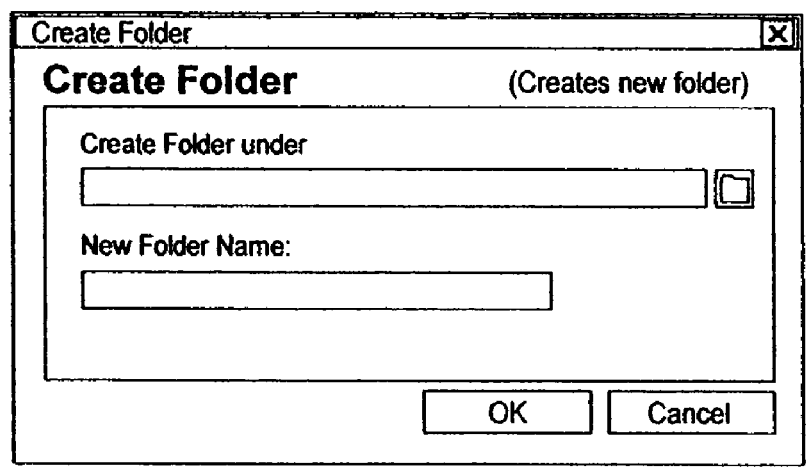
FIG. 6 shows the database folder creation window.

In the Create Alias window, the user clicks on the button with the yellow folder icon to locate the "parent" folder of the new folder to be created. See FIG. 6. The use enters the new folder name and clicks OK. DQuery/Web displays the "Create Alias" dialogue again, showing the folder just created in the Database Folder slot. The user then clicks OK.

DQuery/Web displays the "Select/Add Alias" dialog (See FIG. 4), with the new alias now highlighted. To continue, the user double-clicks on the alias or clicks OK. DQuery/Web then displays the new database object on the Design Surface of dQuery/Web.

The user has now created a first database object. The screen should now look similar to FIG. 1, with a new database object window showing the object name in the title bar at the top of the window.

The user now saves this data module by clicking on the "Save in" button to locate the proper database folder. Saving a data module is done by clicking the File/Save menu option or the Save toolbar button. For the first time that the user is saving a data module, the user must tell dQuery/Web where to save the new data module and what to call it. This requires use of File/Save from the Main menu. Once the proper folder is displayed, the user double clicks on the folder to open it, enters the data module name into the file name field, and clicks "Save". DQuery/Web then saves the new data module.

Creating Query Objects

A query object is a representation of the user's data. It may represent all the rows and columns in a single table; a combination of rows and fields from multiple tables (a join) or a subset of rows from a table or a combination of tables. In the present example, for the sake of simplicity, query objects are used to represent all the columns and rows of the Customer and Invoice tables.

A query object is not a table, since it doesn't necessarily reflect everything that's stored in the table in the user's server or hard drive. A query object represents selected row and column information from the user's tables. In the present example, no tables or data exist yet. In this case, dQuery/Web generates query objects as a by-product of creating the user's Customer and Invoices tables.

For its query objects, dQuery/Web uses SQL statements to define subsets and joins. For example, when the user selects "all" rows and columns from a table called TABLENAME, dQuery/Web generates the following statement: "SELECT * FROM TABLENAME". DQuery/Web's SQL Query Designer and SQL Statement dialog let the user easily and quickly design and implement much more complex SQL statements.

Figures 7, 8A:
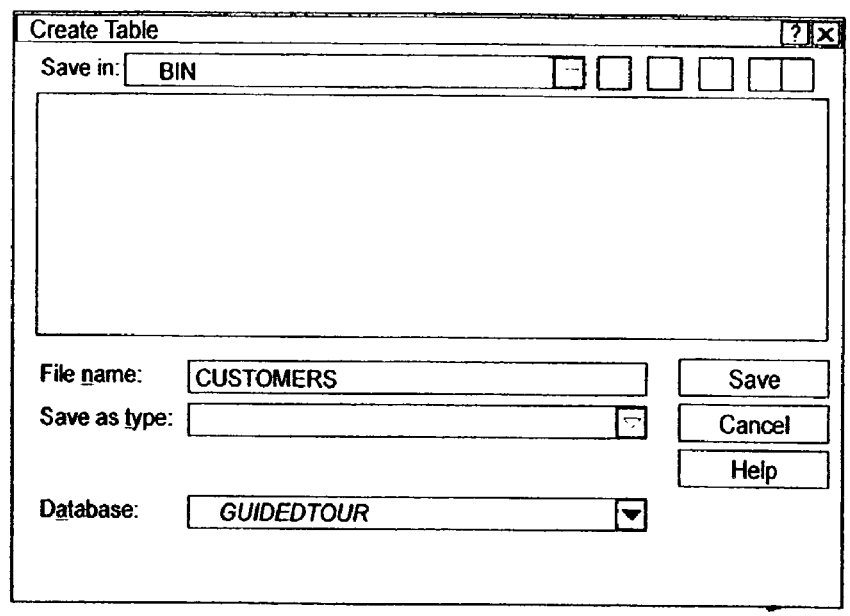
FIG. 7 shows the table creation window.
FIG. 8a shows the Table Designer window for the Customer table.

The user brings up EasyStart and clicks on "Query objects" (option 2). The Add Query dialogue box will now appear with the option "Create Query from new table" selected (figure not shown). The user clicks Continue to bring up the Create Table dialogue. See FIG. 7.

To create the table of customers, the user enters "CUSTOMERS" into the File name field. The dialog is displayed with the user's current database selected. Whenever a database is selected, the "Save in" at the top of the display is ignored and tables are stored wherever the database object is set up to look for them.

The user may have any number of database objects open simultaneously. If the user intends to use dissimilar tables (such as Access and Oracle tables), a separate database object is required to represent each database of dissimilar type.

Figures 8B, 8C:
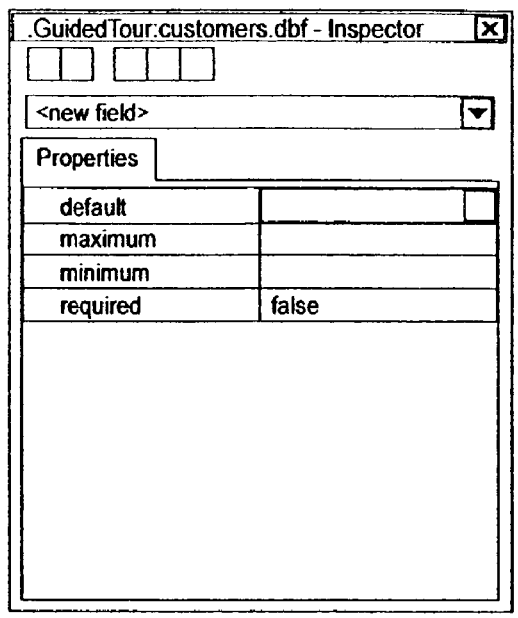
FIG. 8b shows the object Inspector window.
FIG. 8c shows the Table Designer window after Customer table data element additions.

The user clicks Save to continue. Two new windows will appear: the "Table Designer" (FIG. 8a) and the "Inspector" (FIG. 8b).

The Inspector is a powerful tool called an object browser that allows the inspection and modification of all of the properties, events, and methods of dQuery/Web's objects.

The user selects the Table Designer to design the Customers and Invoices tables. The first field in the "Customers" table is a unique identifier for each customer. The user selects the "AutoIncrement" field type, which automatically generates the next number in sequence whenever a new record is added. The user enters "CustNo" under the Name column for field 1. The user selects the field type by tabbing to the Type column and arrowing down to select "AutoIncrement". DQuery/Web sets the field width to "4", indicating an internal representation of 10 digits within the space of four eight-bit characters.

The user then creates an index for this field in the Customers table. Indexes provide fast lookups and allow the user to change the search and display order of a query. In this case the user sets the index in ascending order. dBASE, Paradox, FoxPro, and Advantage tables allow the user to define and select an index. Doing so can improve performance by a factor of ten or more, depending on the frequency and structure of database queries for the tables being indexed. SQL database engines such as Oracle, SQL server, and Informix also use indexes, although the user may not select them explicitly—the SQL engine itself determines whether a helpful index exists, and then selects it automatically. In either case, performance benefits result from adding an index on any field on which the user expects to search or filter, regardless of the type of database engine(s) used.

The user clicks on the Index column and selects "Ascend", to indicate the order (ascending) in which the data are to be shown. The user hits Enter to create the next field, and continues on until the Table Designer includes all the fields defined in FIG. 8c.

Since the SalesYTD field represents currency, the user sets the decimal to 2 places. The user ends up with three indexes, one each on the CustNo, LastName, and Zip fields, and all of them set to "Ascend". The user then closes the Table Designer to continue. A dialogue box appears asking the user to save the changed information. After clicking Yes, the user sees a "CUSTOMERS1" query object on dQuery/Web's Design Surface. See FIG. 1.

To clear a portion of the Design Surface, the user drags the new query object toward the center of the screen. Any of the components can be moved to any section of the screen. The user can use the "splitter"—the line that crosses the middle of the screen—and drag it up or down to change the size of the Design Surface relative to the Live Data Area. This is convenient when there are many query objects in a data module.

The user then adds another query object for the invoice data, repeating the same process used to create the Customers table. The user names the table "Invoices" and uses the field definitions in FIG. 9.

The Amount and BalanceDue fields are both for currency, so the user sets the decimal places to "2" for each of them. Both the "CustNo" and "Date" indexes must be set to ascend. The user then clicks "X" to close the Table Designer, and Yes when asked to save current changes to the Invoices table. The final query object is now complete. The database object and the two query objects (CUSTOMERS1 and INVOICES1) are now displayed in the Design Surface area. The user slides the new INVOICES1 query object over to the right of the screen. See FIG. 1.

Setting Active Indexes

Figure 10A:
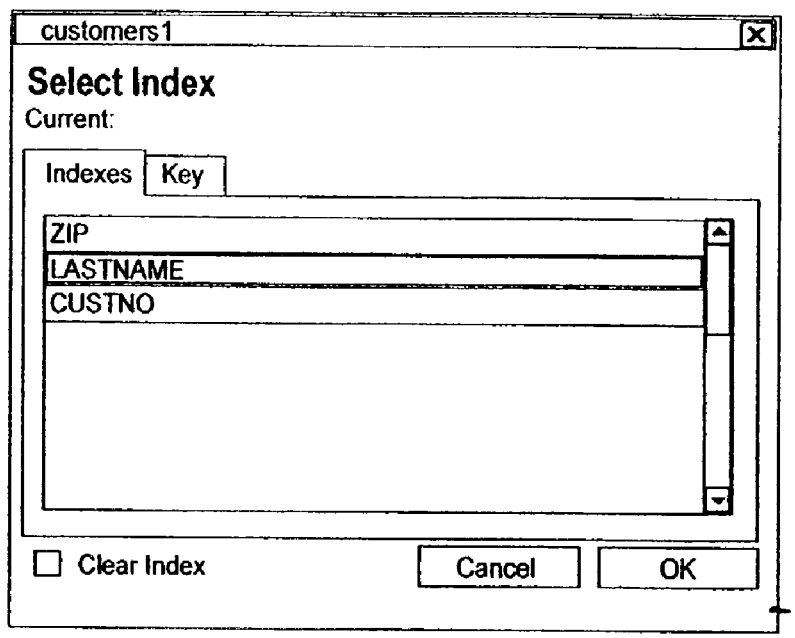
FIG. 10a shows the active index selection window for the customers query.

From the indexes created, the user now designates one which is to be active for each of the two query objects. The active index determines the display order and search order for the query. In the Design Surface, the user right-clicks on the CUSTOMERS1 query object and selects the "Set Index" option from the menu. The Select Index window will appear listing the three indexes the user made available using the Table Designer. See FIG. 10a. The user selects "LASTNAME" and clicks OK.

Figure 10B:
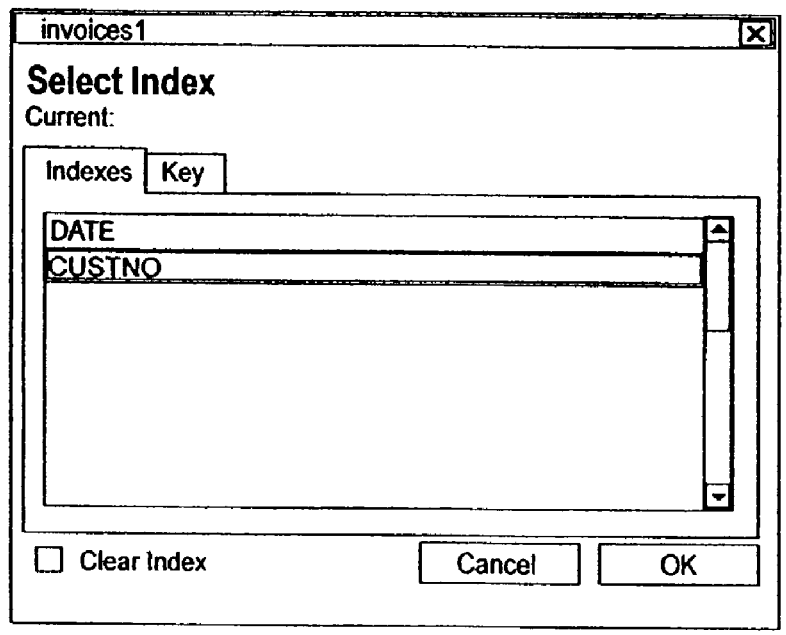
FIG. 10b shows the active index selection windows for the invoices query.

For the INVOICES1 query object, the user right-clicks on the INVOICES1 query object, selects the "Set Index" option from the menu, sets the Index to "CUSTNO" in the same manner as in the preceding paragraph, and clicks OK. See FIG. 10b.

When the user's data is entered or reported, it appears in the order specified for the query object associated with the specific data.

Creating a Parent-Child Link

The user connects the two query objects by creating a parent-child link. A parent-child link is a way of associating two query objects so that, as the user moves from row to row in the parent query, dQuery/Web filters the child query to show only the rows that match the current row in the parent query. Parent-child relationships are an extremely useful way to organize information, and dQuery/Web's process for creating them is simple. See FIG. 1. The user left-clicks on the CustNo field of the CUSTOMERS1 query object, holds the mouse down, and drags the field to the INVOICES1 query object. When the user releases the left mouse button, dQuery/Web links the two tables.

As a result of the parent-child link the user has created, the act of moving from one customer to another in the CUSTOMERS1 query object triggers dQuery/Web to filter the INVOICES1 query to display only invoices belonging to the currently selected customer.

Entering Data

The user enters data into databases via the newly-created queries as follows. The bottom half of dQuery/Web's main screen (FIG. 1) is the Live Data Area. Three tabs appear here: "Data", "Custom View", and "Current Report". The user selects the Data tab, and then selects the CUSTOMERS1 query object by clicking anywhere on the body of the query object. The user now sees the data in the CUSTOMERS1 database, as Note: When the user selects a query by clicking on a query object on the Design Surface, dQuery/Web immediately changes the data in the Live Data Area below to reflect the currently selected query object.

Figures 9, 11:
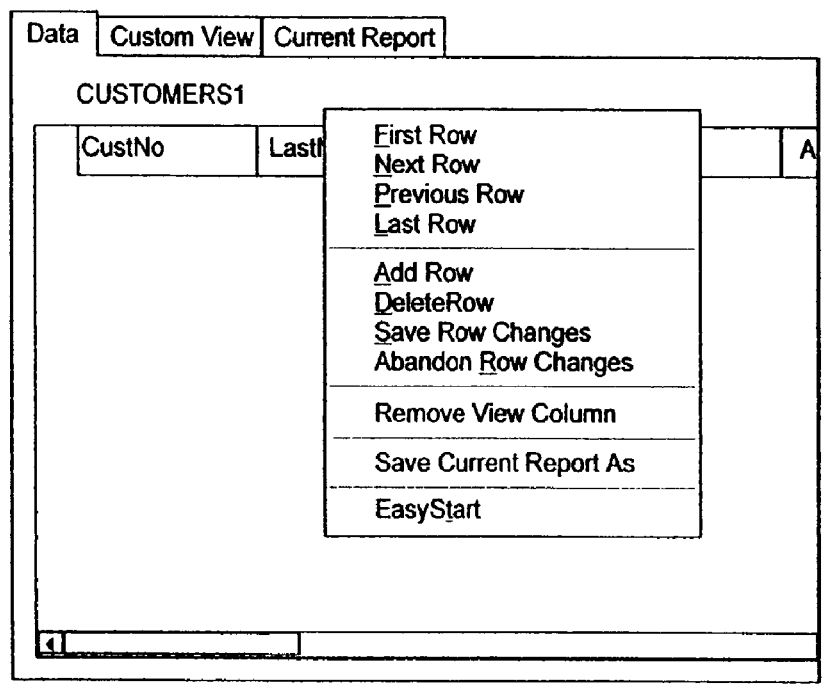
FIG. 9 shows the Table Designer window for the Invoices table.
FIG. 11 shows the table row processing menu.

The user right-clicks in the data area (the open area at the bottom of the Data tab). A menu appears (FIG. 11). The user selects the "Add row" option from the menu. DQuery/Web adds a blank row to the CUSTOMERS1 table. The user enters a first customer:

"Taylor", "Paul", "222 Sunrise Drive", "Endwell", "NY", and "13760" in the appropriate fields, and a SalesYTD of "10000.00" for that customer. Note that dQuery/Web has set the CustNo field to AutoIncrement in order to assign the next number automatically.

The user then hits the <Enter> key and dQuery/Web displays a new blank row. The first customer's data is complete. Additional customers may now be added to the table. See FIG. 12.

After the data are all entered, the user right-clicks in the data area and selects Save Row Changes from the displayed menu. Because the active index is set to "LastName", the three customers are displayed in order of their last names. The user could also have set the index to "CustNo" or "Zip", in which case the customer records would display in order of customer number or ZIP code respectively.

To add invoices for a customer, the user selects a specific customer, say, "Taylor", for which CustNo=1, by selecting any of the fields in the "Taylor" row of CUSTOMERS1. To add invoices for Taylor, the user selects the INVOICES1 query object by right-clicking on the INVOICES 1 query object on the Design Surface. DQuery/Web indicates the current query by: 1) changing the selected query's display to a "highlight" color, and 2) changing the name at the top of the Data tab on the Live Data Area.

The user right-clicks in the Live Data Area. DQuery/Web displays the context-sensitive Data menu. The user selects the Add Row option from the menu. Because CustNo 1 (Taylor) is the currently selected row in the CUSTOMERS1 table, dQuery/Web already shows the first invoice CustNo as "1". Because of the parent-child link, dQuery/Web assigns to the current customer any invoices the user adds.

Figure 13:
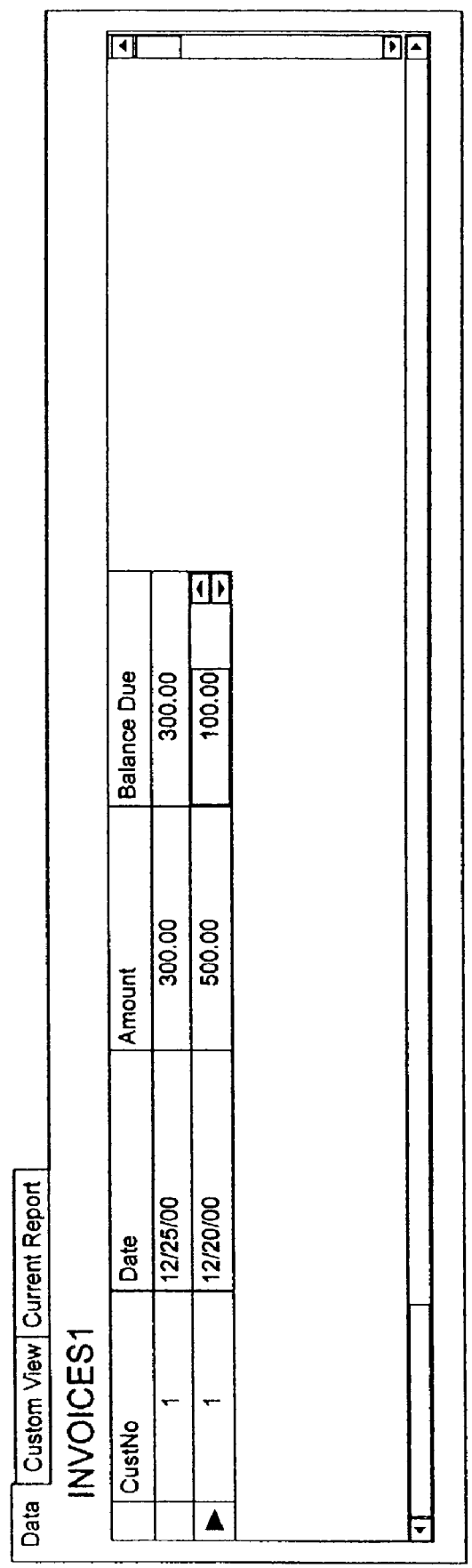
FIG. 13 shows the data display for the invoices table.

The user creates the first invoice, entering "12/25/00" as the Date, "300.00" as the Amount, and "300.00" as the BalanceDue. The user adds one more invoice for Taylor. See FIG. 13.

Now the user hits the <Enter> key to start a third row, this time entering "2" as the CustNo value to enter an invoice for a different customer (in this case, Jones). The user enters "12/26/00" as the date, "300.00" as the amount, and "300.00" as the balance due, right-clicks in the Live Data Area, and selects the Save Row Changes from the menu to save the newly-entered invoice.

In this case, the invoice with CustNo "2" disappears from the Live Data Area display. Because of the user's parent-child link, only invoices for the customer currently selected in the CUSTOMERS1 table are displayed. The currently-selected customer is CustNo 1 (Taylor). The invoices for CustNo 2 (Jones) will be displayed when CustNo 2 (Jones) is the currently selected customer in the CUSTOMERS1 table.

To view Jones' invoices, the user selects the CUSTOMERS1 Query object and changes the currently selected customer to Jones (CustNo 2) by clicking on that row. When the INVOICES1 Query object is selected again, dQuery/Web displays Jones' invoice in the live-data area.

Filtering Data

A filter changes the appearance and content of displayed data. For example, a user can set conditions for a date range (last week, this week, etc.), or for amount ranges on numeric fields like SalesYTD. DQuery/Web will display only the data that meets the conditions. This provides immediate flexibility in selecting and viewing database data.

To add a filter in dQuery/Web for the data entered in the example, the user selects the CUSTOMERS1 query object so that the customer data is showing in the live-data area. The user then clicks on the Main Menu's Filter option and selects "dBASE Filter—Non-Indexed" to bring up the dBASE Filter dialogue (FIG. 14).

Figure 14:
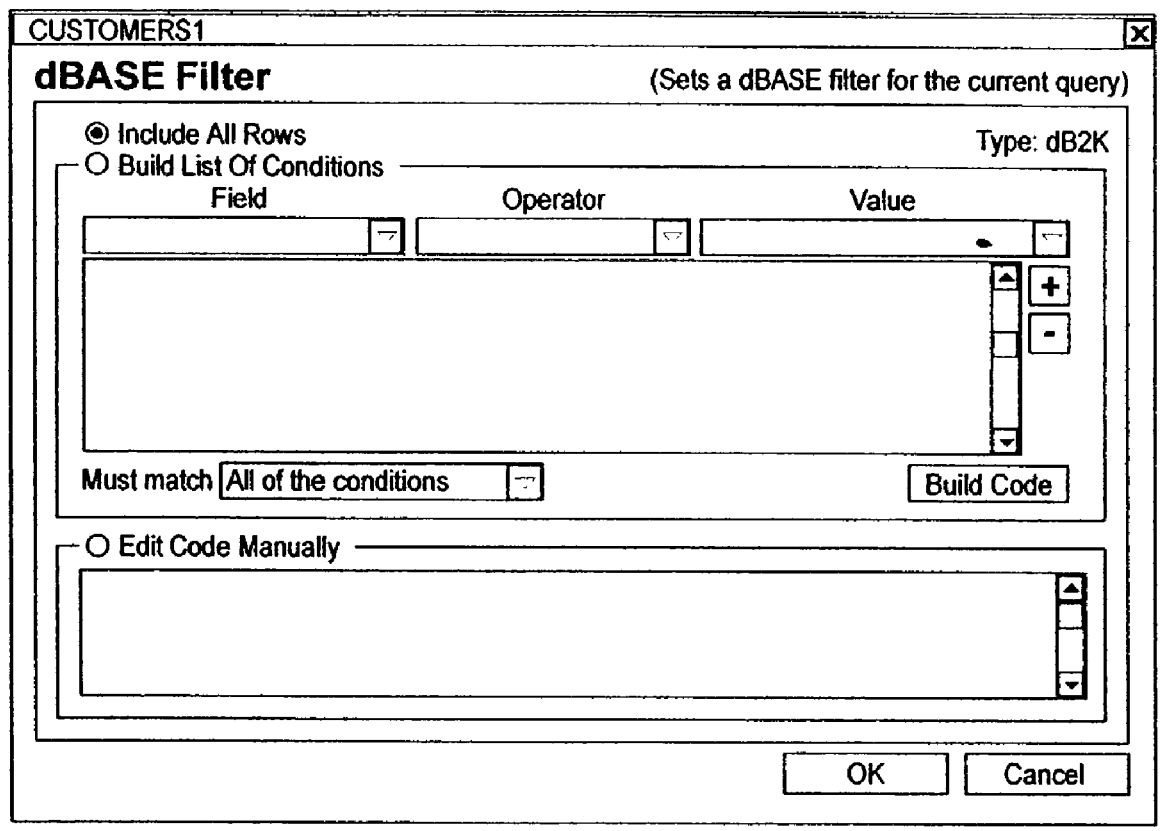
FIG. 14 shows the database query filter window for inclusion of all table rows.
Figure 15:
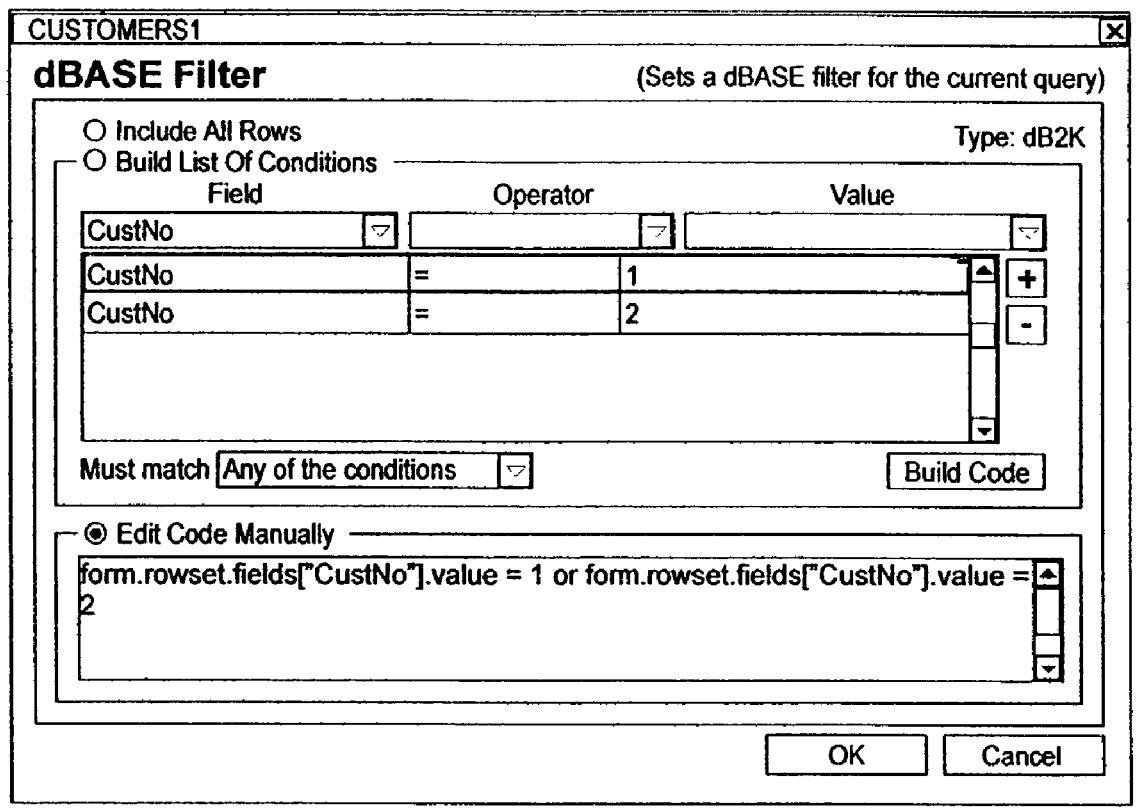
FIG. 15 shows the database query filter window with a list of filter conditions set, and a display of the code for the filter conditions.

Note that the Option "Include All Rows" is set in FIG. 14. This reflects no filtering. The user who is building a list of filter conditions selects the option "Build List of Conditions". See FIG. 15. DQuery/Web makes the "Field", "Operator", and "Value" options available, displaying them in highlighted form. The user intends to select all records with CustNo equal to 1 or 2. The user first sets a condition to select records where CustNo equals 1. The Field CustNo is already displayed (it's the first field on the list). The user sets the Operator to "=", enter "1" for the Value, and clicks on the "+" (Plus) button to add the condition to the list.

The user's second condition is to select records where CustNo equals 2. Again, the Field (CustNo) is correct as is. The user sets the Operator to "=", enters "2" for the Value, then clicks the "+" button. The user wants to see all records where the value of CustNo is either "1" OR "2". The user changes the "Must Match" field to "Any of the Conditions".

The user then clicks the "Build Code" button to see in the bottom pane the code for the prepared list of conditions. The user may wish to create or modify condition code for a filter. In this case, the user selects the "Edit Code Manually" option. DQuery/Web then makes accessible the code area of the screen.

The user clicks OK, and dQuery/Web displays only customers Jones (CustNo=2) and Taylor (CustNo=1) in the data area, in accordance with the filter conditions. To make all customers appear in the data area, the user may go to the Filter menu and select the Clear All Filters option. All the customers now appear in the data area.

DQuery/Web provides a Filter By Grid feature. When the user selects Begin Filter By Grid, a row clears on the data tab of the Live Data Area. The user types data into any fields to be matched, and clicks on Apply Filter By Grid to execute the search. DQuery/Web shows the Live Data Area as a grid that now displays only rows that exactly match the data the user entered. Filter By Grid only works for exact matches, not partial matches or ranges.

Custom Views

Custom Views allow a user to select and display specific fields from Query objects for custom views of database data. The user may select the fields required, and then use the custom view to generate No-Click ReportsK, illustrated below. A user may have any number of these custom views (represented by reports), all associated with a single data module.

Figure 16:
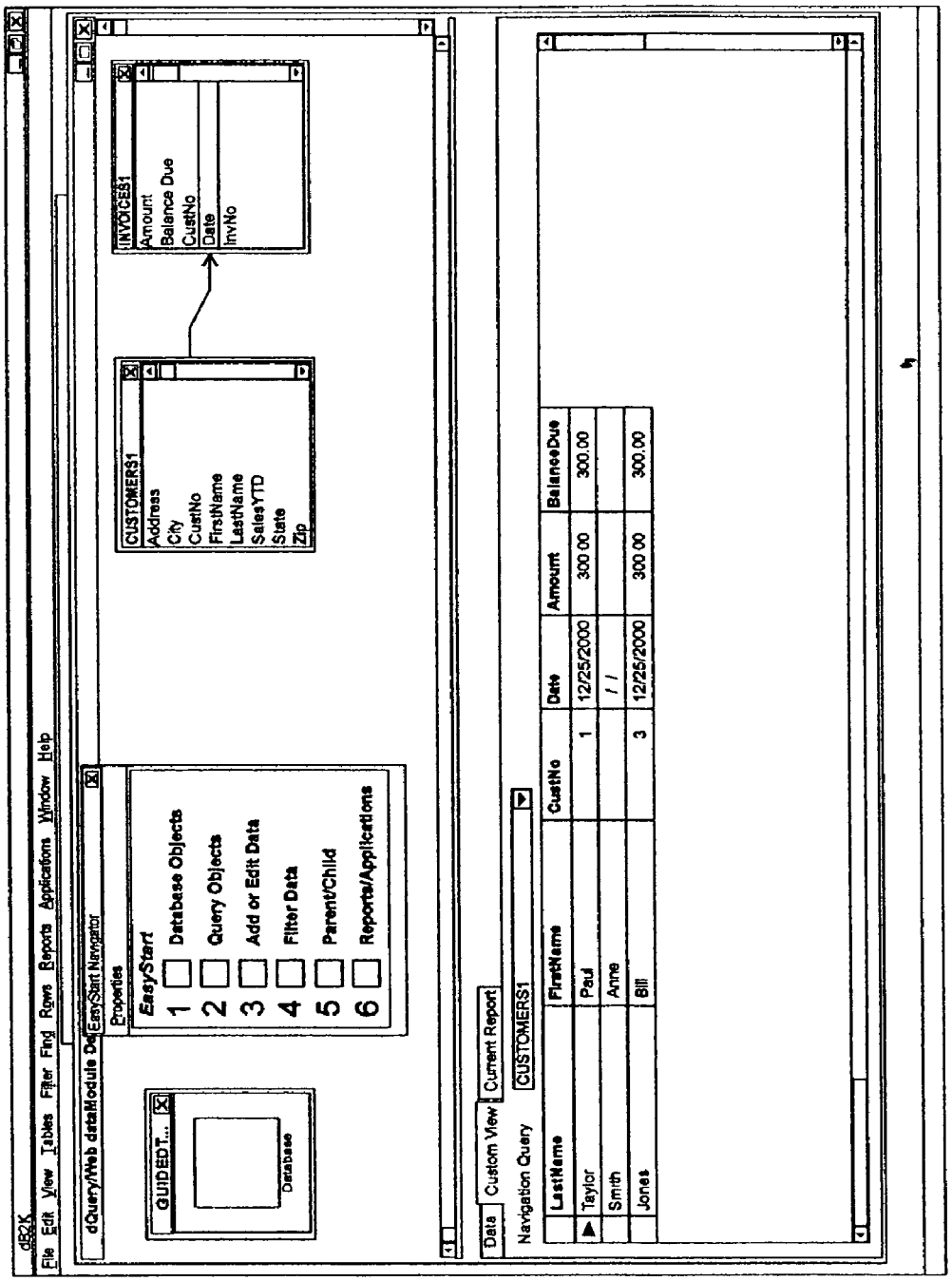
FIG. 16 shows the main screen for the invention with a query displayed in the Live Data Area.

See FIG. 1. To create a custom view in the example, the user selects the CUSTOMERS1 Query object, and selects the "Custom View" tab on the Live Data Area. It should be empty. The user drags and drops the LastName field down to the Live Data Area. DQuery/Web now displays all the user's customers' last names in a single column in the Live Data Area. The user continues by dragging and dropping the FirstName and CustNo fields from CUSTOMERS1 onto the Live Data Area. The display in the Live Data Area now resembles the database table display for the CUSTOMERS1 table. The user now selects the INVOICES1 Query object, and drags and drops the Date, Amount, and BalanceDue fields onto the data area. The user's resulting screen now looks like FIG. 16. DQuery/Web saves the custom view the user has created with the associated data module. The custom view contains data from two related tables: CUSTOMERS and INVOICES.

No-Click Reports

To see an immediate report based solely on a Custom View, the user clicks on the Current Report tab. See FIG. 17. DQuery/Web generates a No-Click Report from the data the user dragged and dropped into the Custom View. This data reflects all the invoices entered for all the customers. The user entered one invoice for Jones, two invoices for Taylor, and no invoices for Smith. If the data had been filtered, the report would have reflected the conditions imposed by the filters.

The user may change how dQuery/Web navigates the data in the report. The report, as specified, currently navigates by customers. To navigate by invoices, the user selects the Custom View tab, and changes the Navigation Query field (located at the top of the live-data area) from CUSTOMERS1 to INVOICES1. The user then selects the Current Report tab once more and dQuery/Web displays only the invoices for Taylor, the currently selected customer.

The user saves the Custom View customers report by selecting the Custom View tab, setting the Navigation Query back to CUSTOMERS1, clicking on the Current Report tab, going to the File menu, and selecting the "Save Current Report As" option. DQuery/Web then prompts the user to save the data module. The user selects Yes, enters a title such as "CustomerSales" as the report name, and saves it in the desired file folder.

DQuery/Web can associate multiple reports with a single data module. At the top of the Live Data Area, the drop down field-list of Current Reports (located at the top of the live-data area) shows the reports available. In the example, the user sees two reports: one called No-Click Report and one called CUSTOMERSALES.REP. Since the user hasn't modified the original No-Click Report, they are identical. The user may change the CUSTOMERSALES report to associate multiple reports with a single data module.

Figure 18:
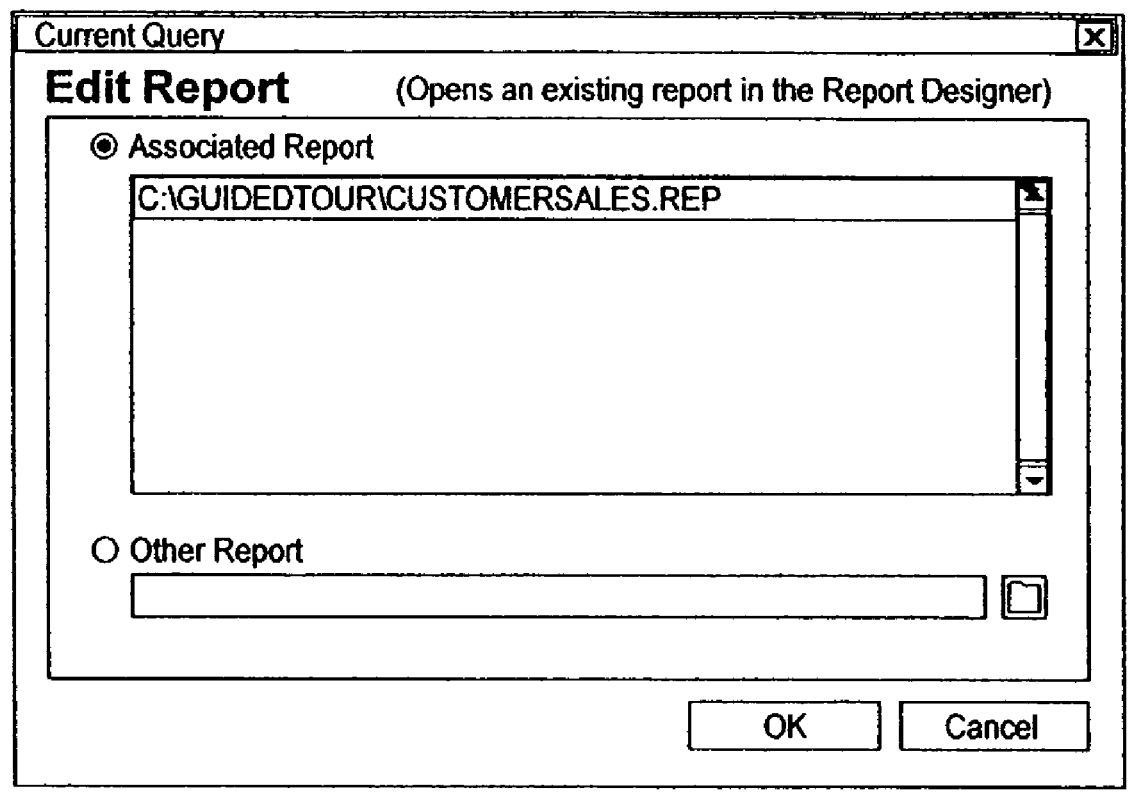
FIG. 18 shows a report editing window for the invention's reports.

The user first selects "No-Click Report" to make the CUSTOMERSALES.REP report available for change. The user then opens the Reports menu at the top of the screen and selects the Edit Reports option. DQuery/Web displays a dialog such as that in FIG. 18.

Figure 19:
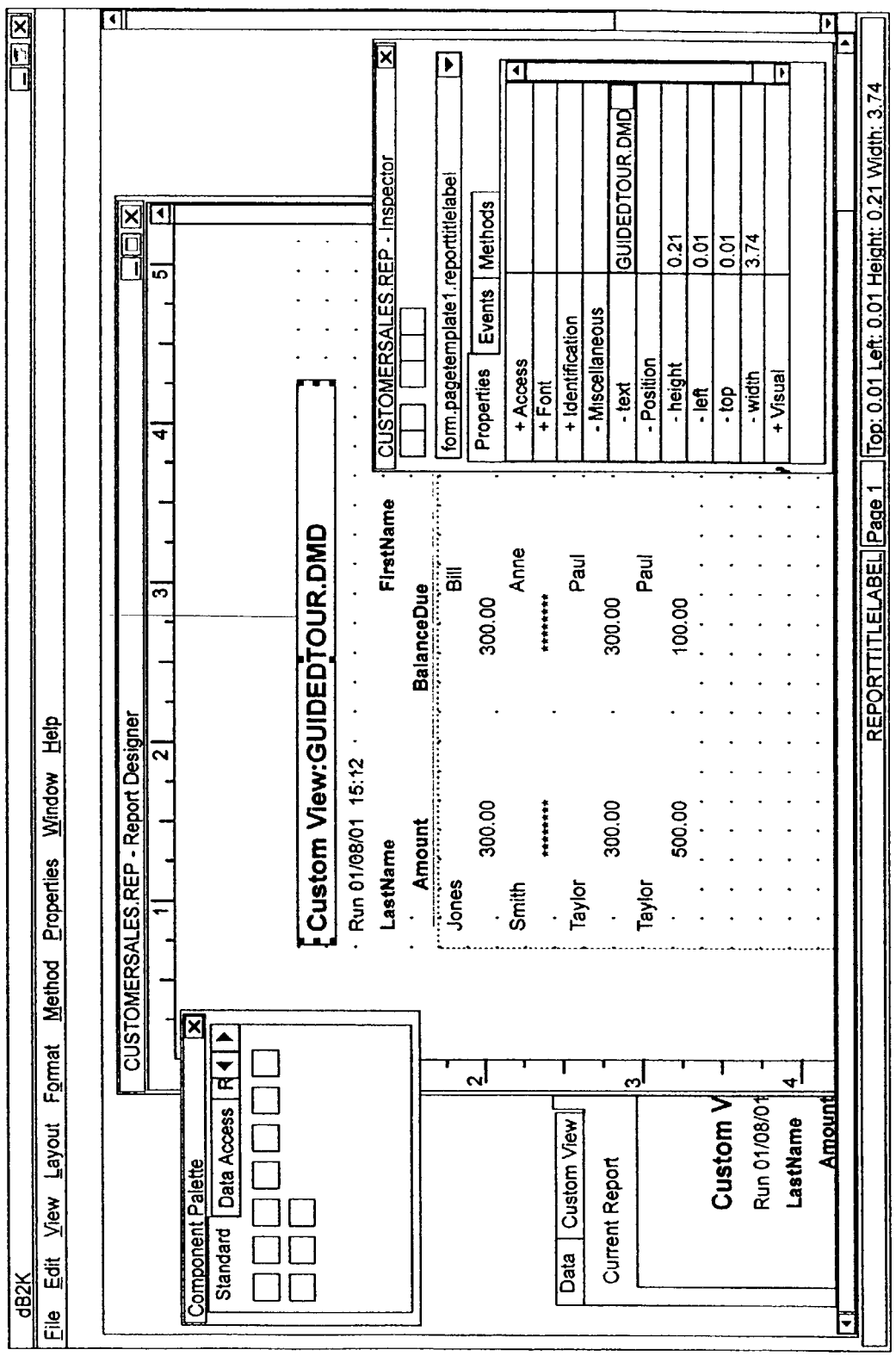
FIG. 19 shows the Report Designer window, the Component Palette window, and the Inspector window.

The Edit Report dialog allows the user to edit any reports associated with the current data module. If the user wants to edit other reports the Other Report option near the bottom of the window allows the user to select any of dQuery/Web's reports on the network. The user highlights the report to be edited, and clicks OK. DQuery/Web displays windows for its Report Designer, its Component Palette, its Inspector, along with the formatting toolbar at the top. For the screen's appearance, see FIG. 19.

The Component Palette provides a full range of objects that may be required to create a report.

If the Inspector is not on the screen, the user right-clicks on the Report Designer and selects "Inspector" from the menu.

DQuery/Web's Report Designer allows the user to modify all aspects of the reports. For this example, the user makes a simple change to the report title by selecting and highlighting the report title, clicking on the Inspector and selecting the Properties tab. To see all available properties, the user right-clicks on any blank grey area of the Inspector and clicks on "Expand All Categories" on the context-sensitive popup menu. The user then scrolls down to the "text" property underneath Miscellaneous and changes the value entered to "Customer Sales Report". DQuery/Web changes the title in the report design surface as the user types the change. The user then closes the report and clicks Yes when prompted to save it.

When the user drops down the list of reports on the Current Report tab and selects CUSTOMERSALES, the title in the displayed report changes. The report modification is complete. DQuery/Web quickly and easily creates, modifies, and displays a variety of reports associated with a single data module.

One-Click Windows Applications

Figure 20:
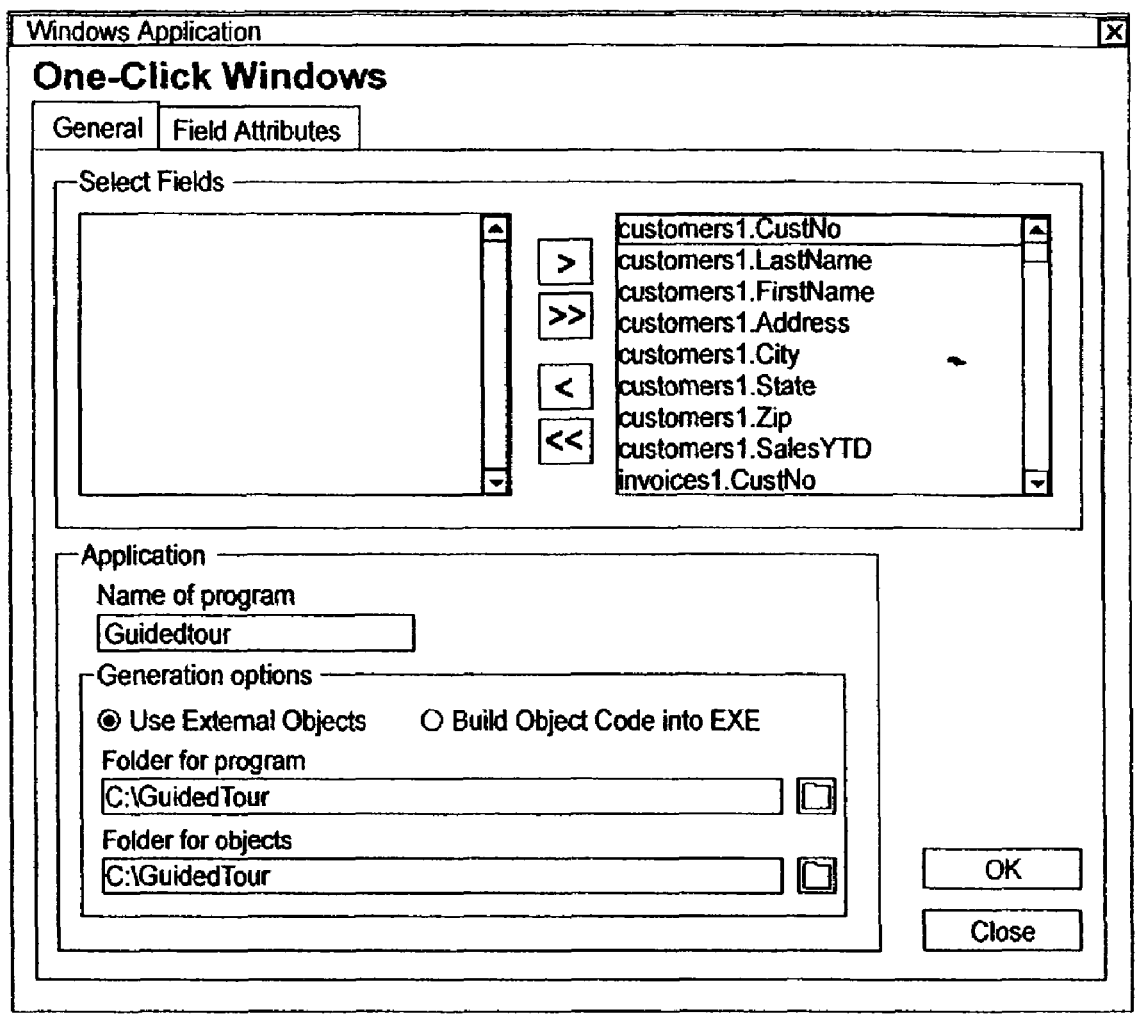
FIG. 20 shows the One-Click Windows application creation window.

In the example discussed, the user has created a database object, database tables, query objects, custom views, and custom reports. These are the building blocks of any database program. DQuery/Web provides the tools to automatically generate both Windows and Web applications based on the user's data module design. The user can quickly create a Windows application with a single click of the mouse. In the first step, the user opens the Applications menu, selects the One-Click Windows option, and selects Yes when asked to save the data module. DQuery/Web displays a window as shown in FIG. 20.

Two tabs are accessible: "General" and "Field Attributes". The first time this window is opened the user must establish folders for both program files and object files on the "General" tab. The user uses the two folder pushbuttons to change each field to desired full-path folder names. DQuery/Web retains the settings the user has made so that in later uses the user only needs to click the OK button to generate the Windows application.

All the fields for the example's two tables are pre-selected. By selecting the Field Attributes tab the user can modify how the field labels appear on data entry screens, and whether or not a given field is required during data entry. For this example, the user makes no changes.

Figure 21:
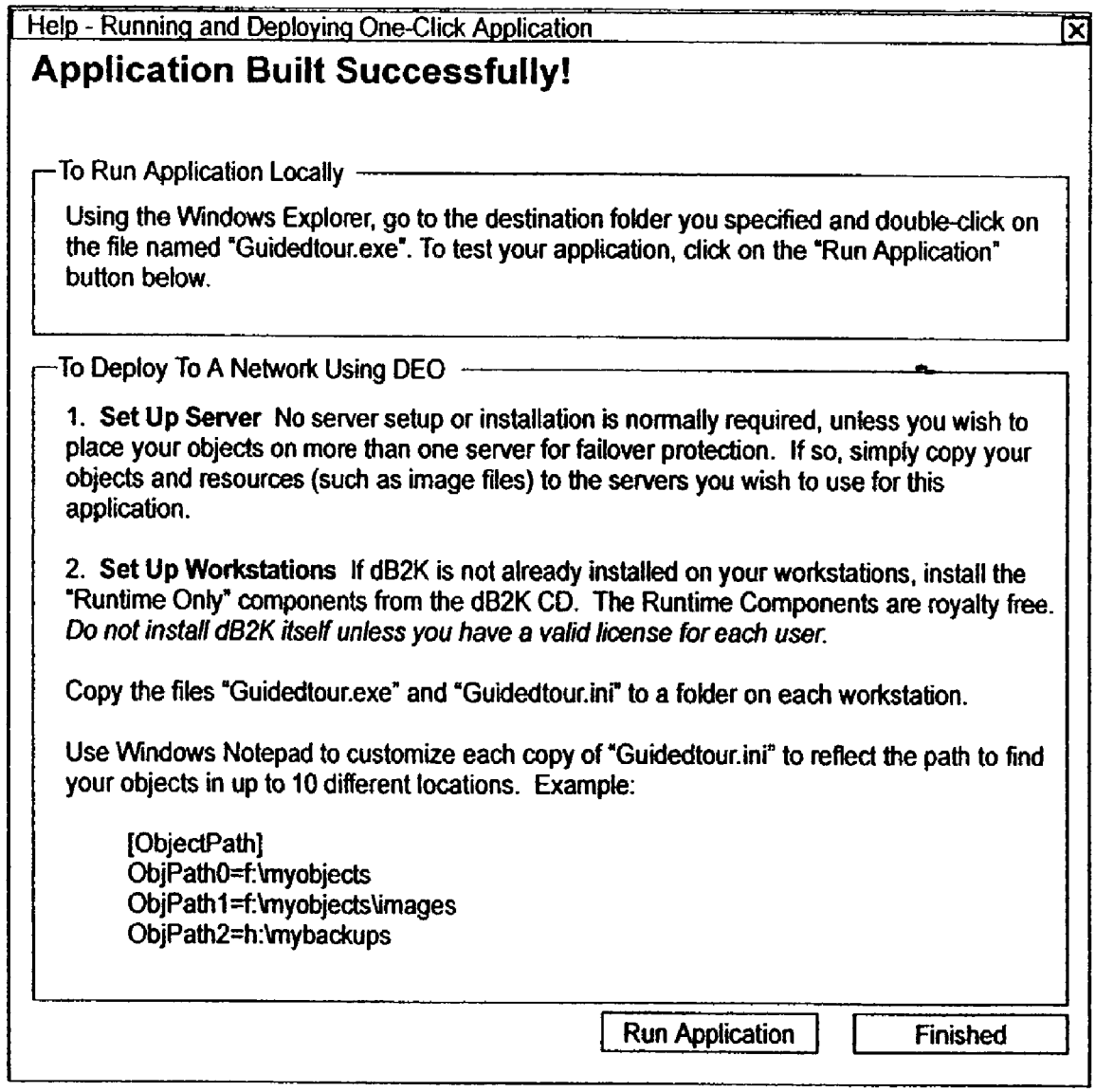
FIG. 21 shows the One-Click Windows confirmation window.

The user insures that the folder settings point to the GuidedTour folder, and clicks OK. DQuery/Web displays a window as shown in FIG. 21, signifying the creation of a fully functional Windows application. The user has done no coding.

The user clicks on the Run Application button to execute the newly-created application. See FIG. 22. The application provides users with a working form for retrieving and reporting combined data from two separate database tables. The application runs as a stand-alone program.

Figure 22:
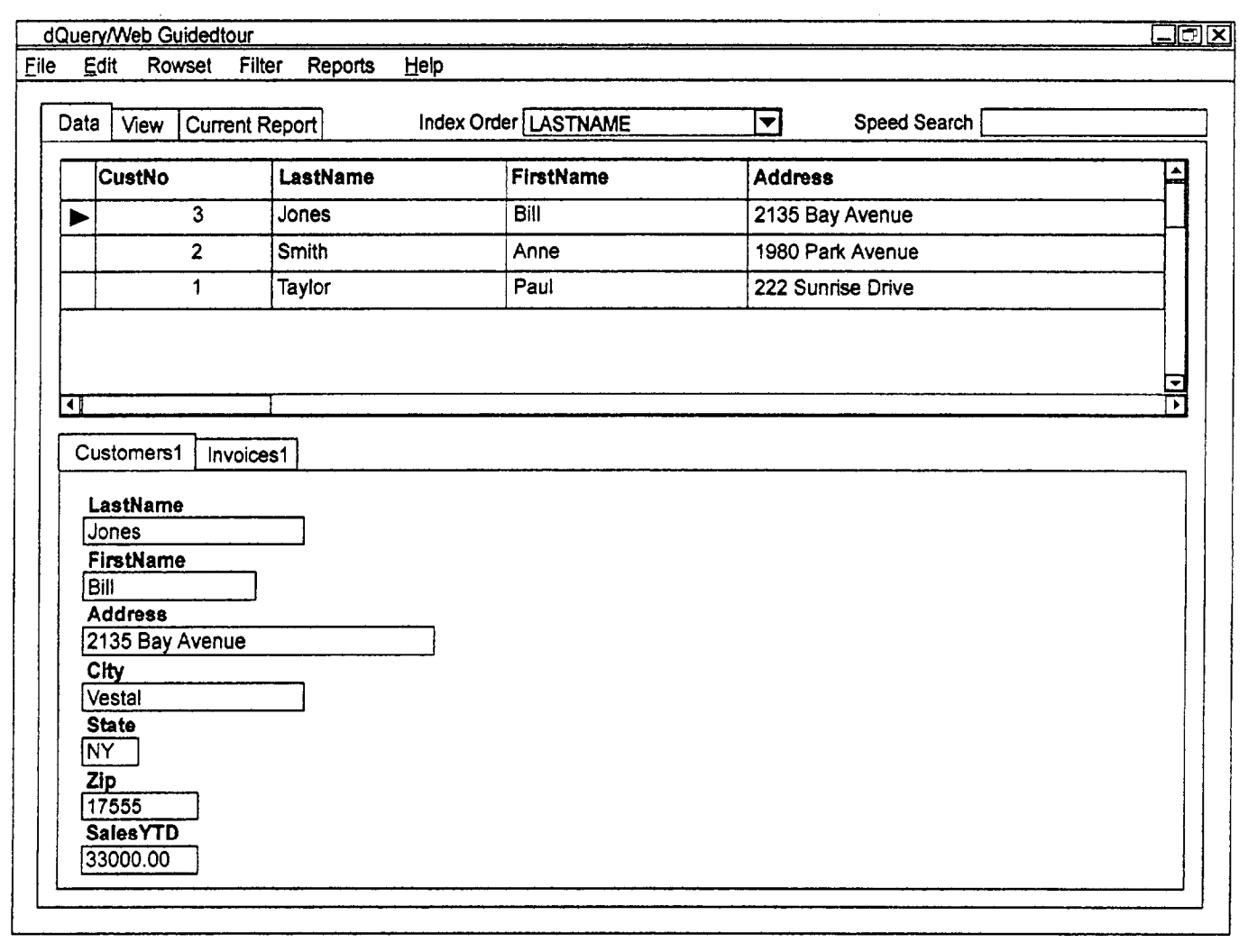

The data-entry screen for the Customers table is displayed in FIG. 22. Clicking on the INVOICES1 tab signals dQuery/Web to display the data entry screen for the Invoices table. Selecting Taylor in the Customers table and selecting the INVOICES1 tab shows the user the live data—the invoices—for Taylor.

The user can edit existing data and enter new data using the Edit menu. The user can locate data by opening the Rowset menu and selecting the Begin Locate by Form option. This option allows the user to locate data by entering data in any field. Similarly, by opening the Filter menu and selecting the Begin Filter by Form option, the user can set a variety of filters simply by entering data into the form.

The user can perform a fast index speed search by selecting the customer table in the view tab, switching to the Data tab, setting the Index Order to LASTNAME, and typing "t" in the Speed Search field. The first customer that begins with "t" (Taylor) is now highlighted.

Figure 23:
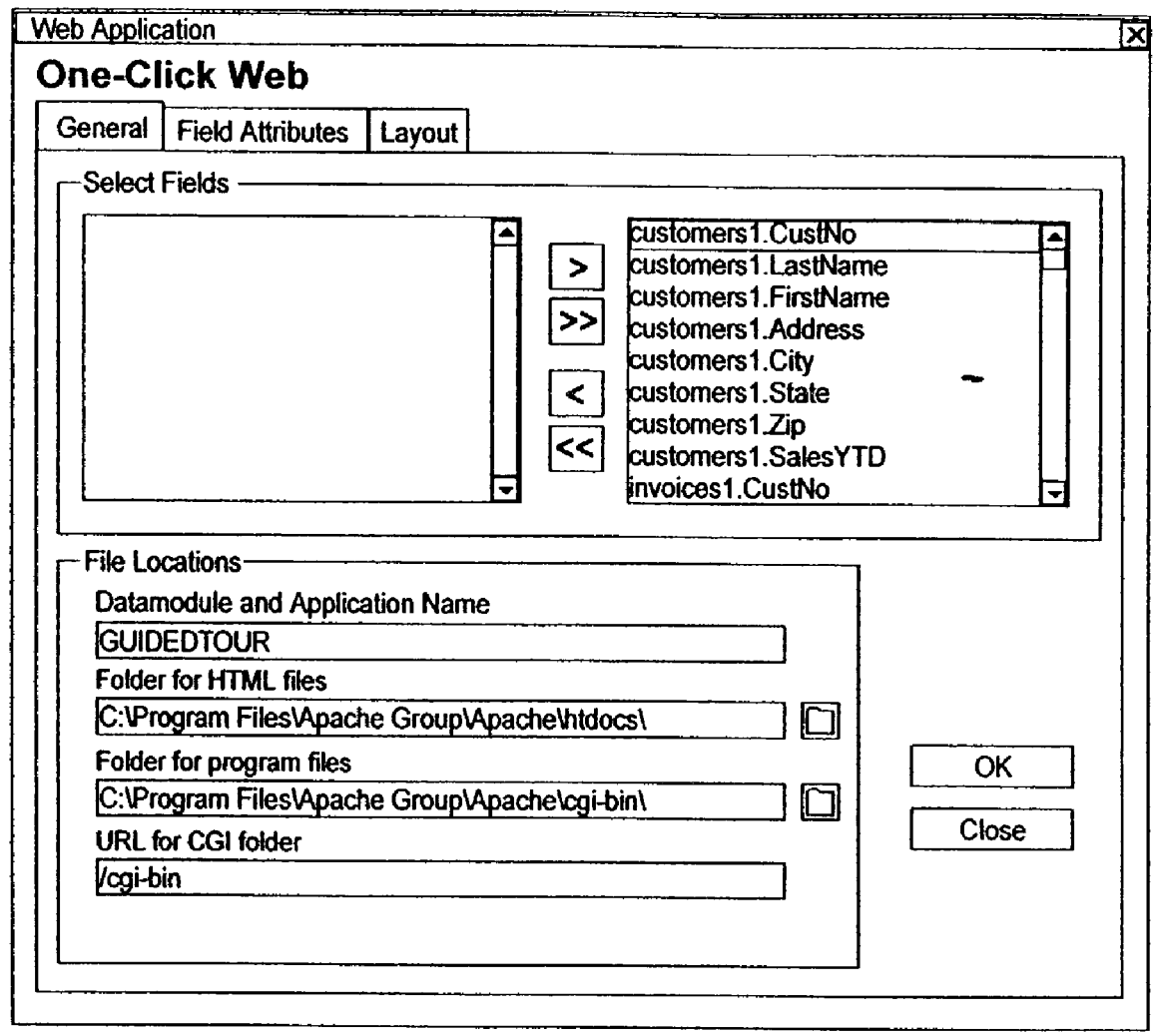
FIG. 23 shows the One-Click Web application creation window.

All the reports associated with the user's data module are available in the Current Report tab. To close the example, the user closes the application, and selects Finished from the menu. DQuery/Web displays its main screen, with the created data module. One-Click Web Applications This example assumes that the user has installed Apache Web Server, and is running it. The user selects the One-Click Web option. If dQuery/Web prompts to save the data module, the user selects Yes. DQuery/Web presents the dialog box shown in FIG. 23.

The One-Click Web dialogue box is very similar to the one defined for One-Click Windows. The folder options are set for a Web application and have preset defaults for the Apache Web Server used for the example. In addition to the "General", and "Field Attributes" tabs, dQuery/Web also displays a tab called "Layout", which allows for manipulation of the color scheme for the user's Web application. For the purposes of this example it is ignored.

Figure 24:
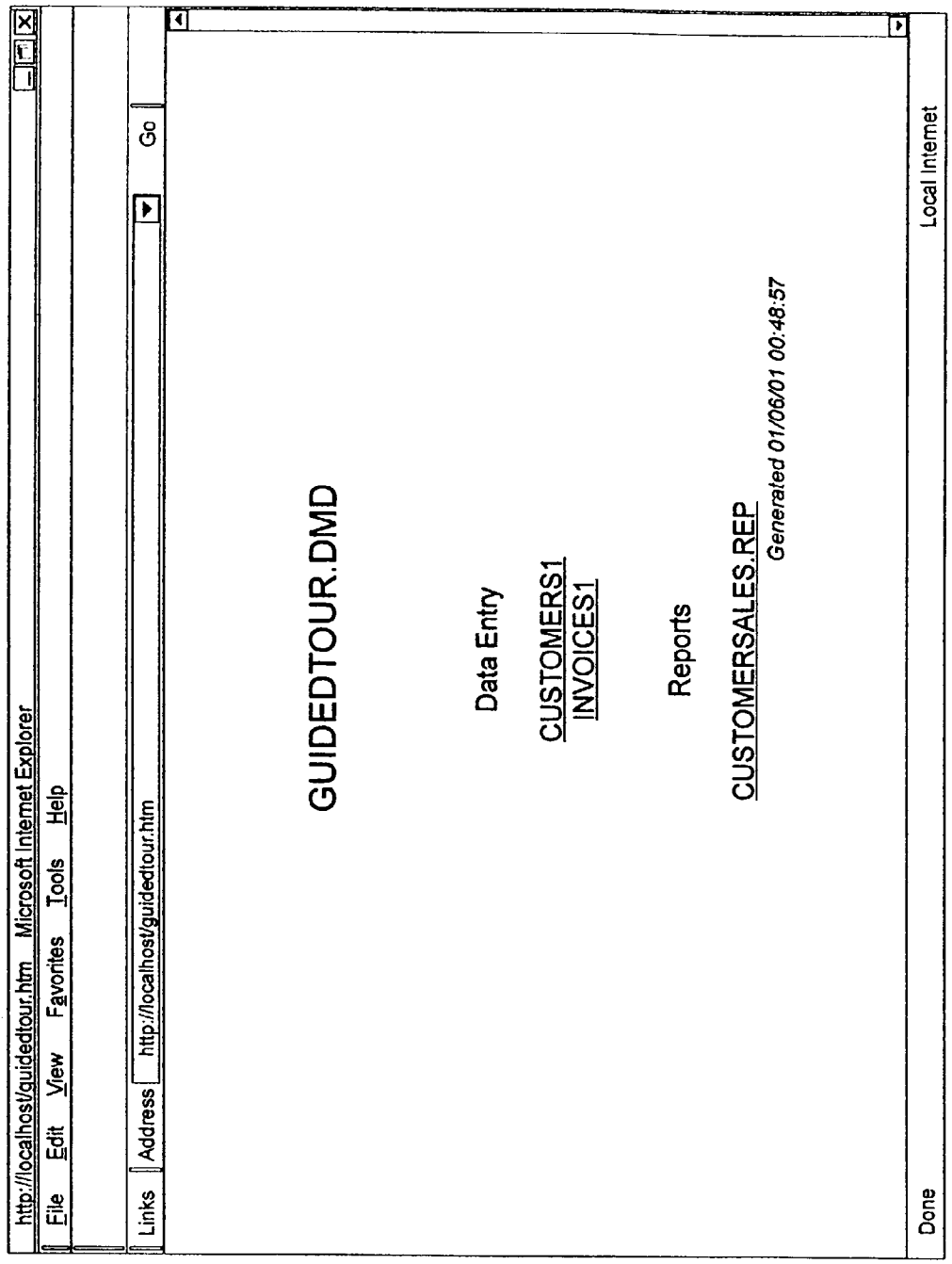
FIG. 24 shows the Web application's opening browser window.

The user accepts all default settings and clicks OK. DQuery/Web displays a dialog box stating that the application is complete. The user clicks OK, minimizes dQuery/Web's window, opens a Web browser, enters the address for the created Web page, and presses <Enter>. The browser displays the page shown in FIG. 24.

Figure 25:
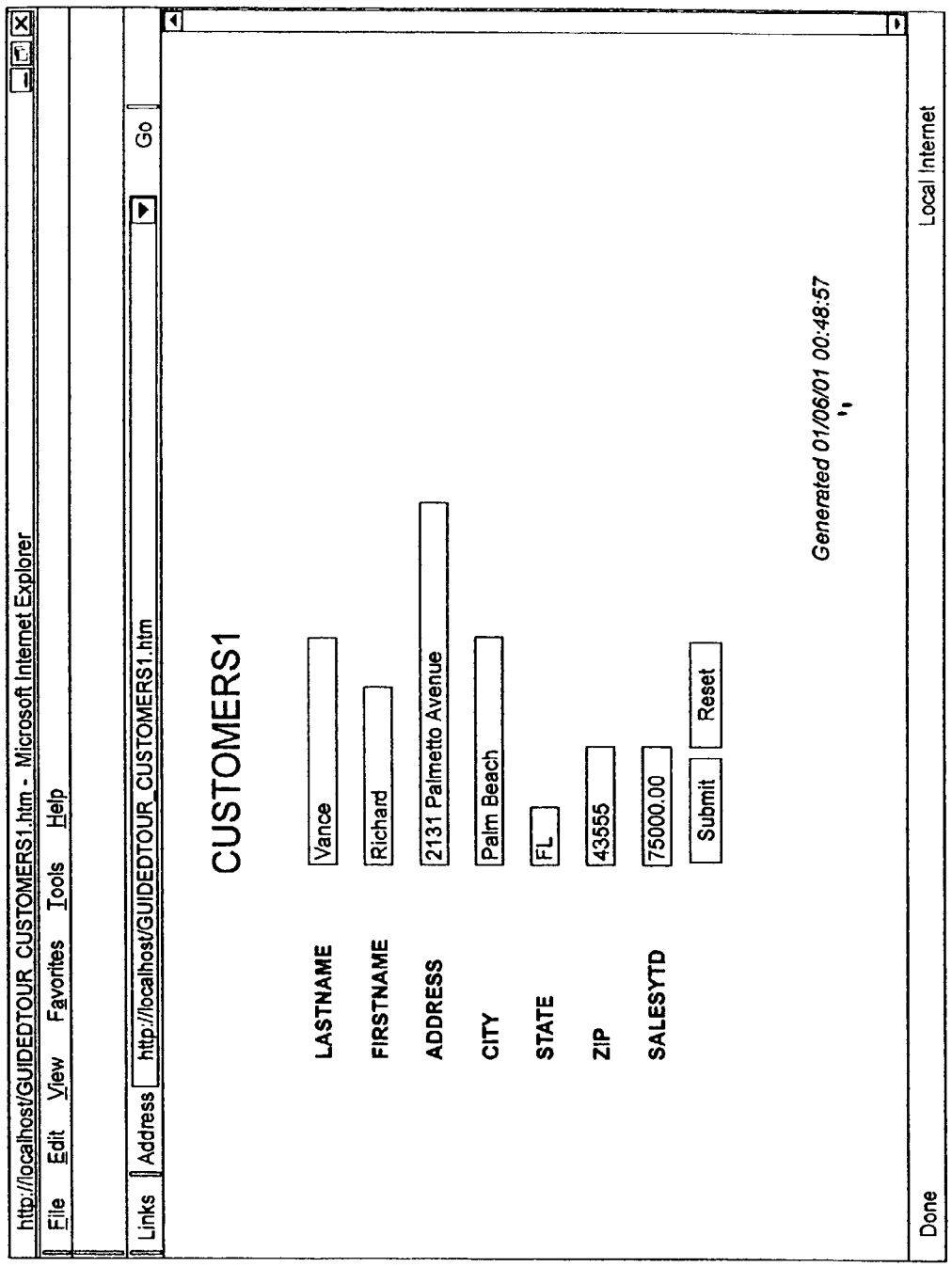
FIG. 25 shows the Web application's operating interface browser window.

The user now adds a new customer to the database records from anywhere on the Web. First, the user clicks on the CUSTOMERS1 link under Data Entry, displaying a Web page as in FIG. 25, and enters the following customer information into the appropriate fields to create a new record:
LASTNAME: "Vance" FIRSTNAME: "Richard"
ADDRESS: "2131 Palmetto Avenue" CITY: "Palm Beach"
STATE: "FL" ZIP: "43555"
SALESYTD: "75000.00"

Figure 26:
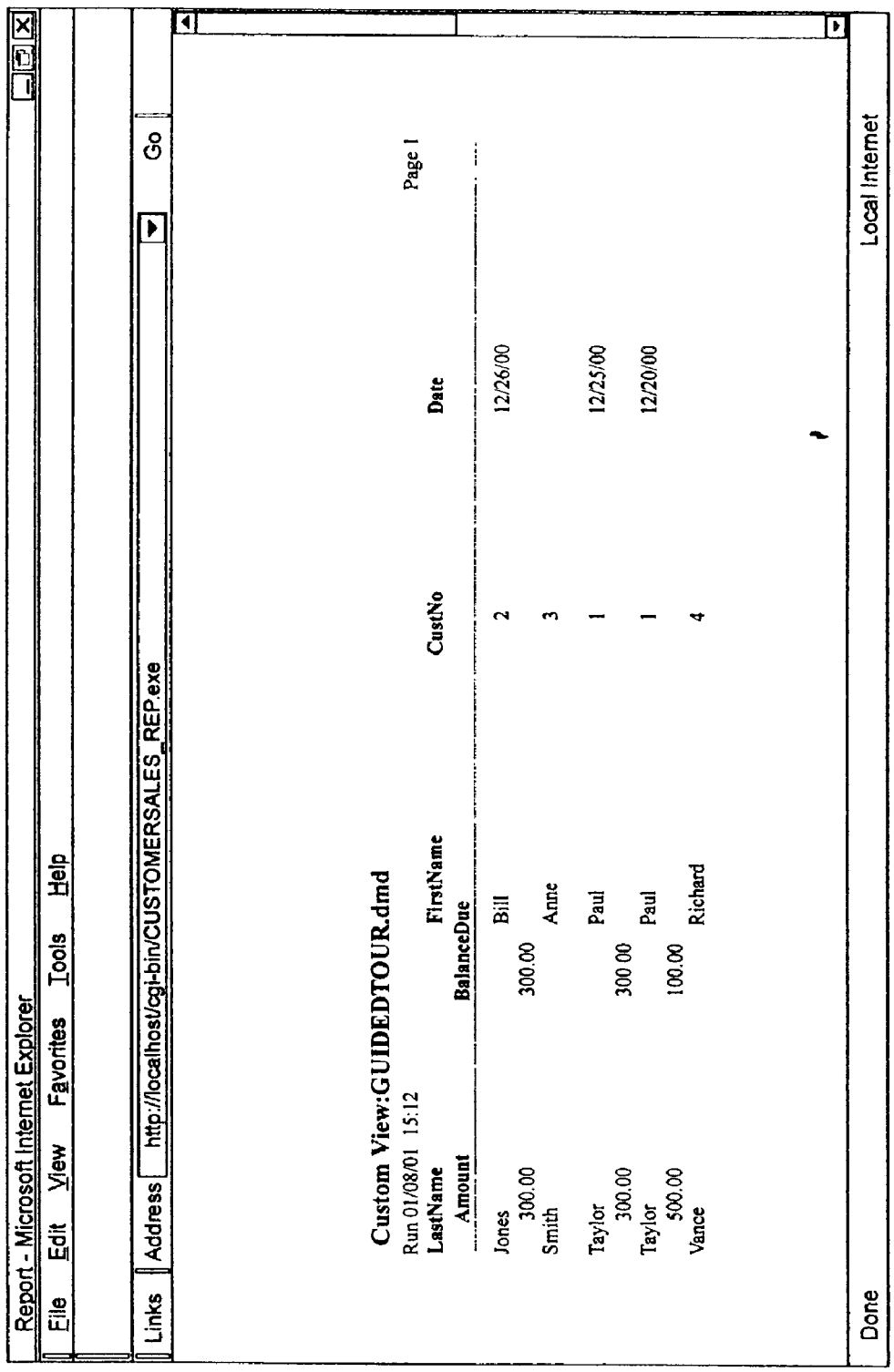
FIG. 26 shows the Web application's report browser window.
Figure 27:
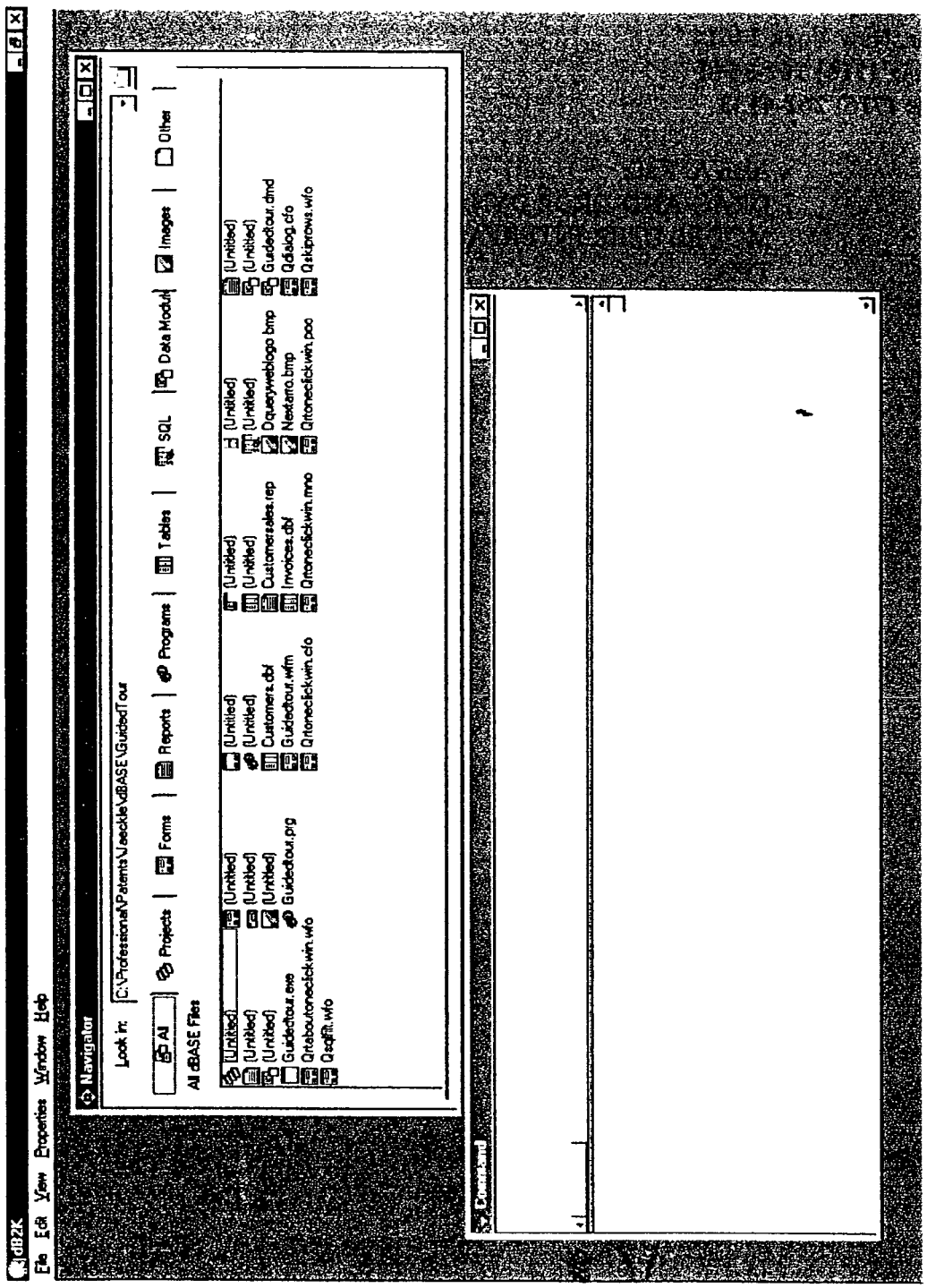
FIG. 27 shows the invention's main window with Navigator and command windows open.
Figure 28:
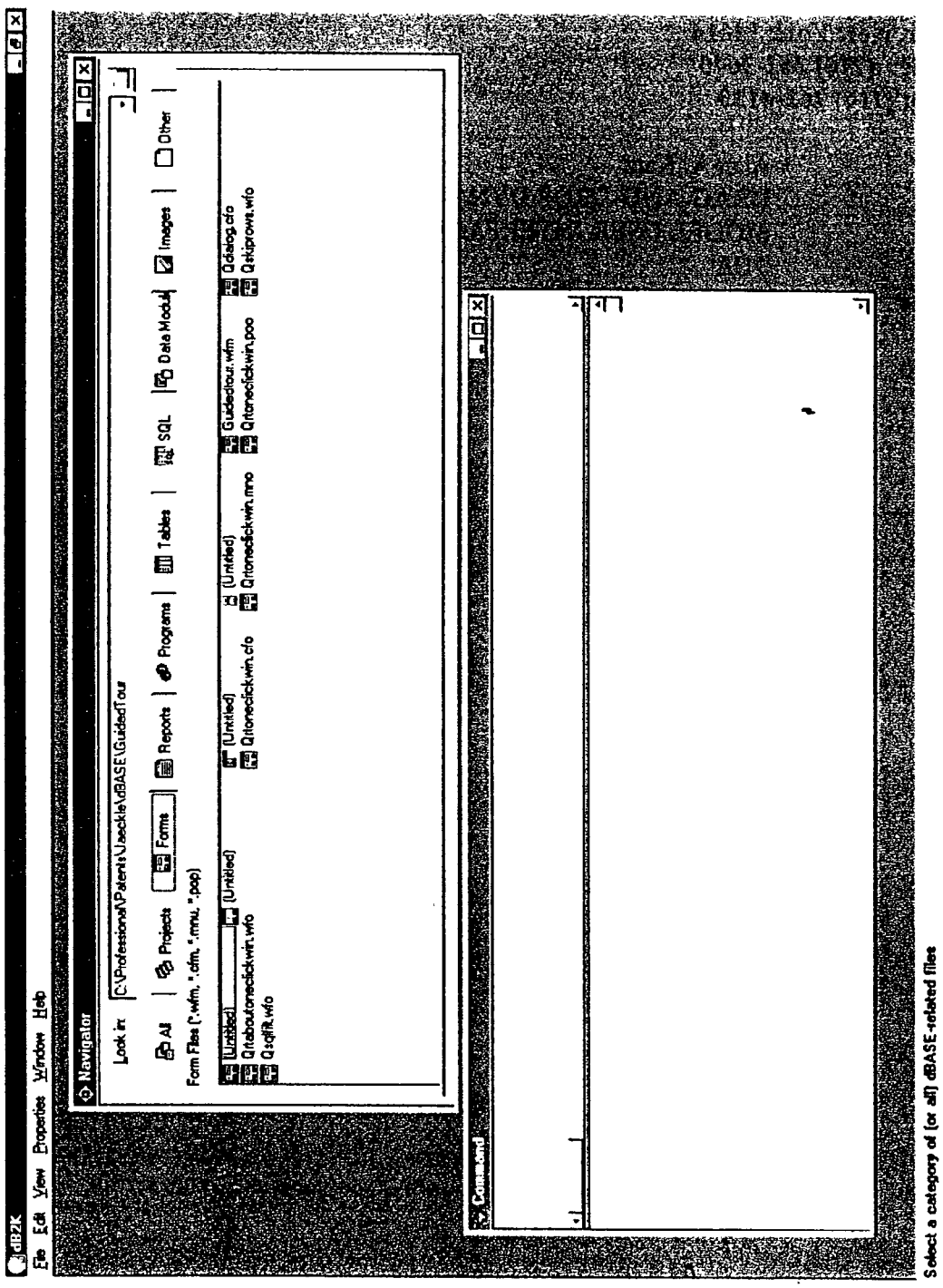
FIG. 28 shows the invention's main window with Navigator window displaying available forms.
Figure 29:
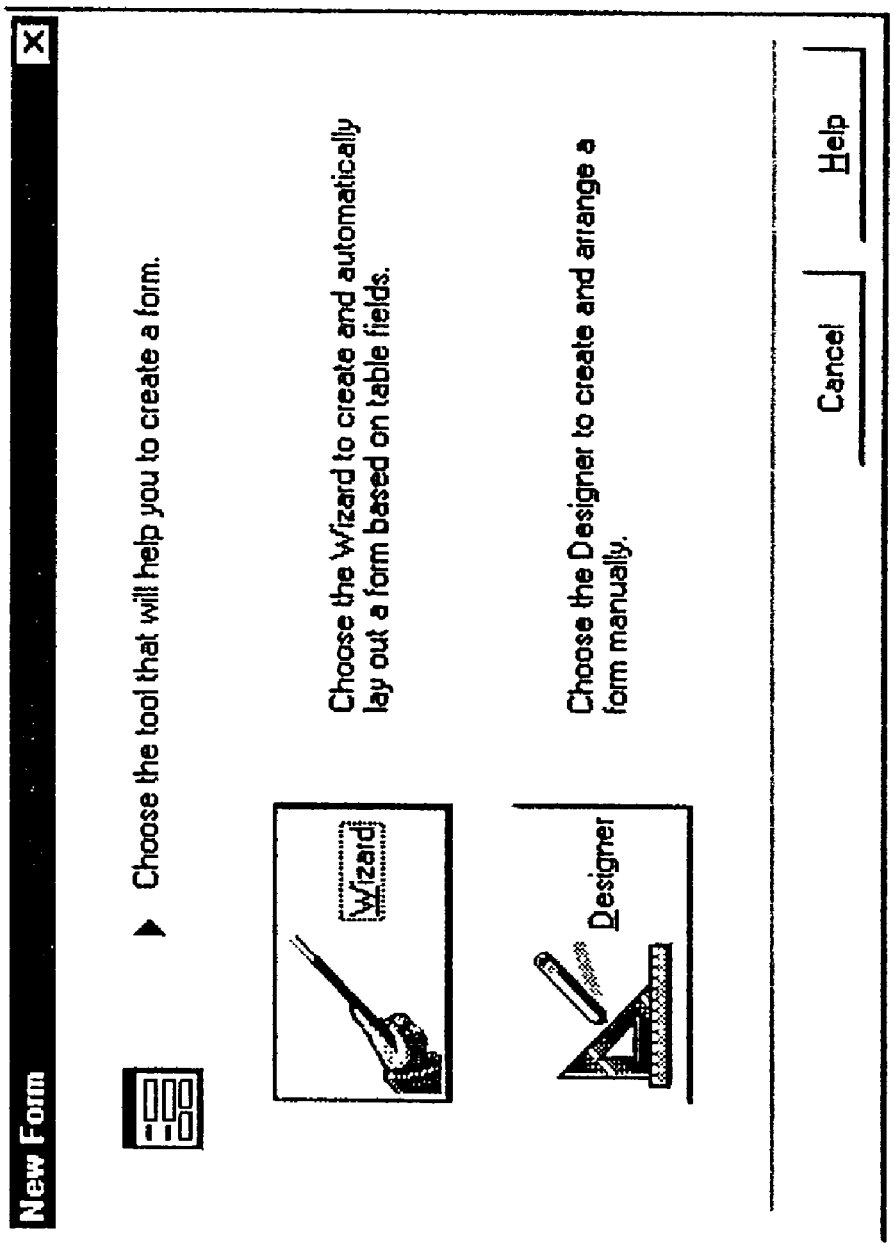
Figure 30:
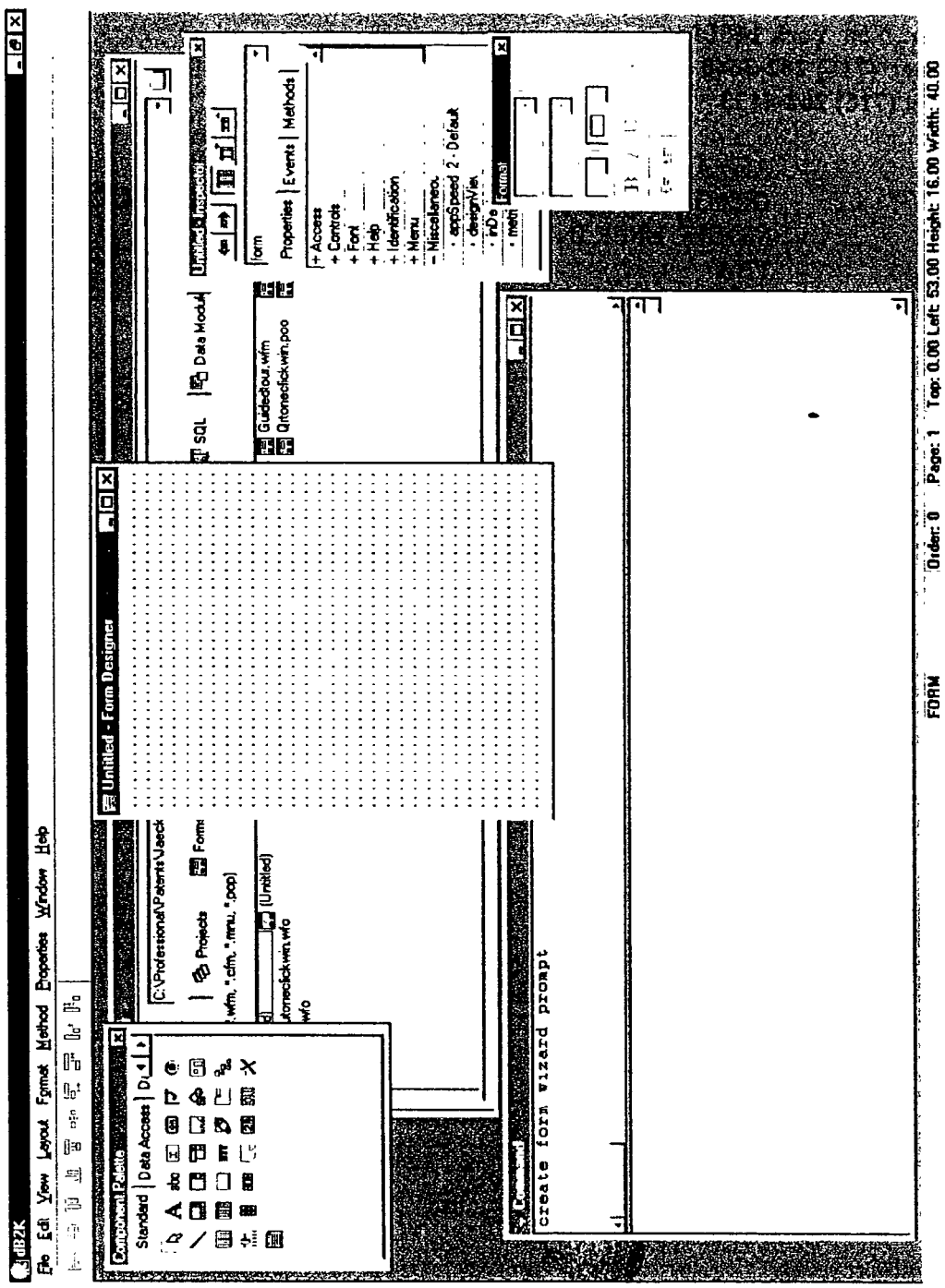
Figure 31:
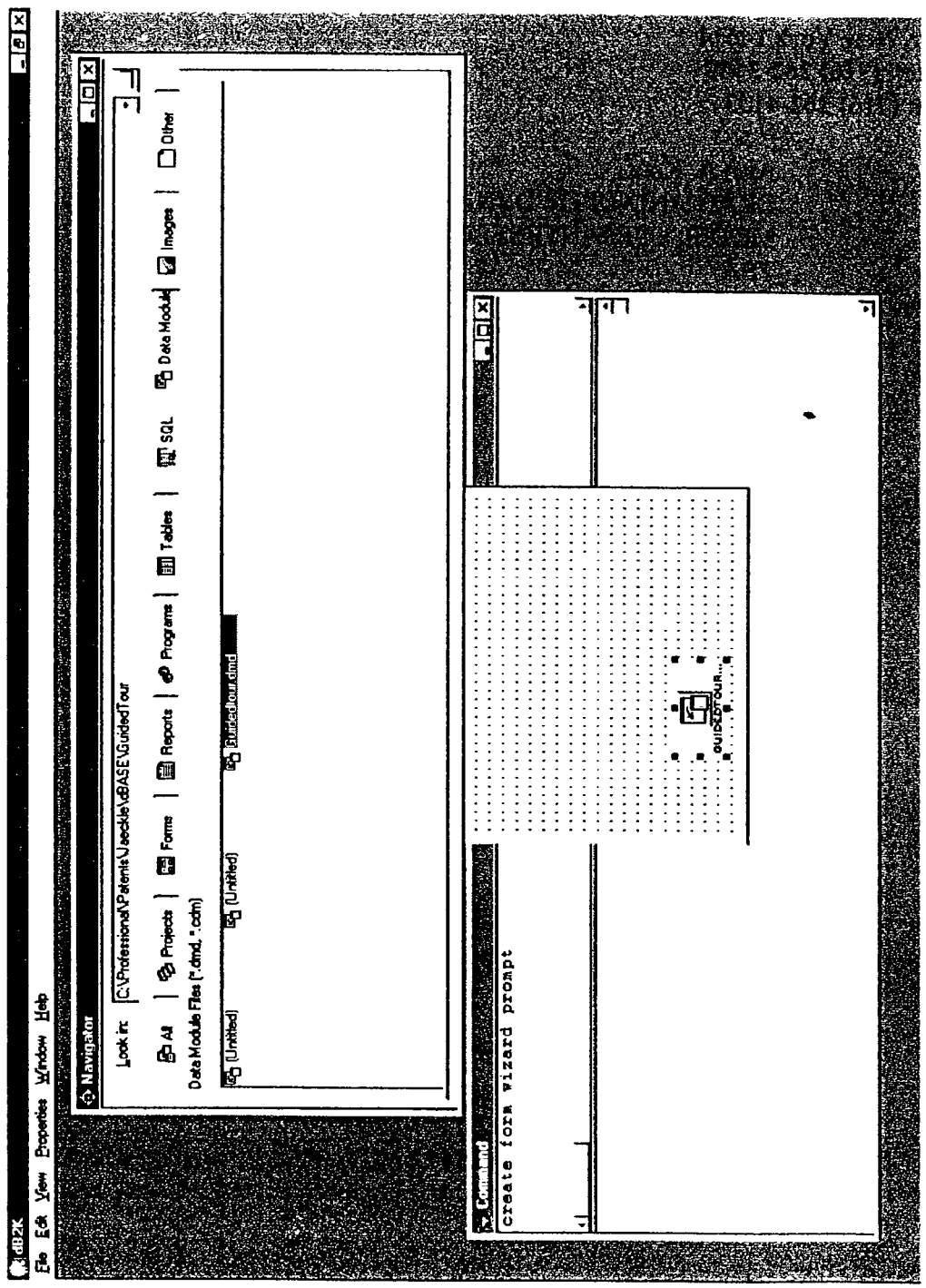
Figure 32:
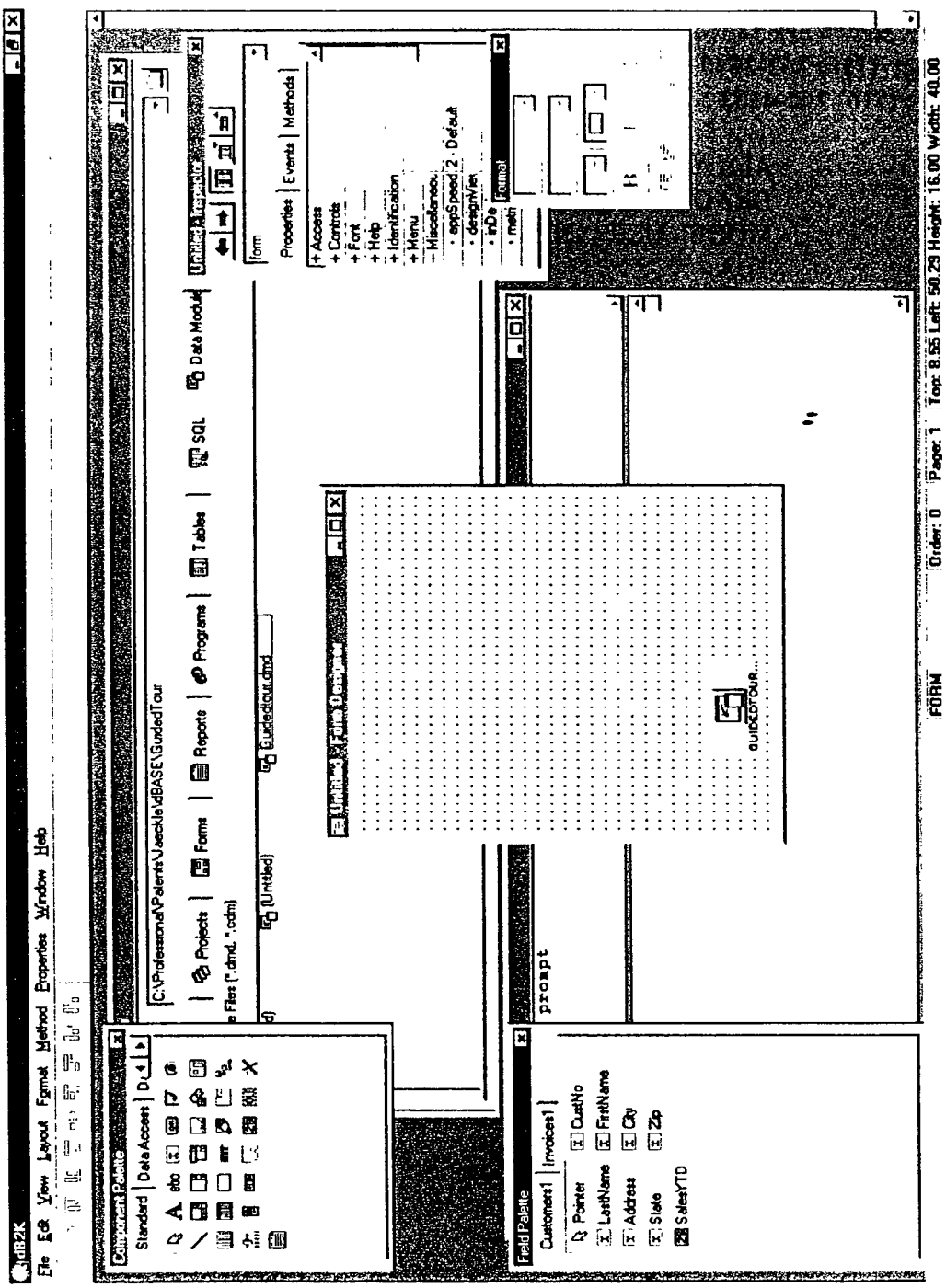
Figure 33:
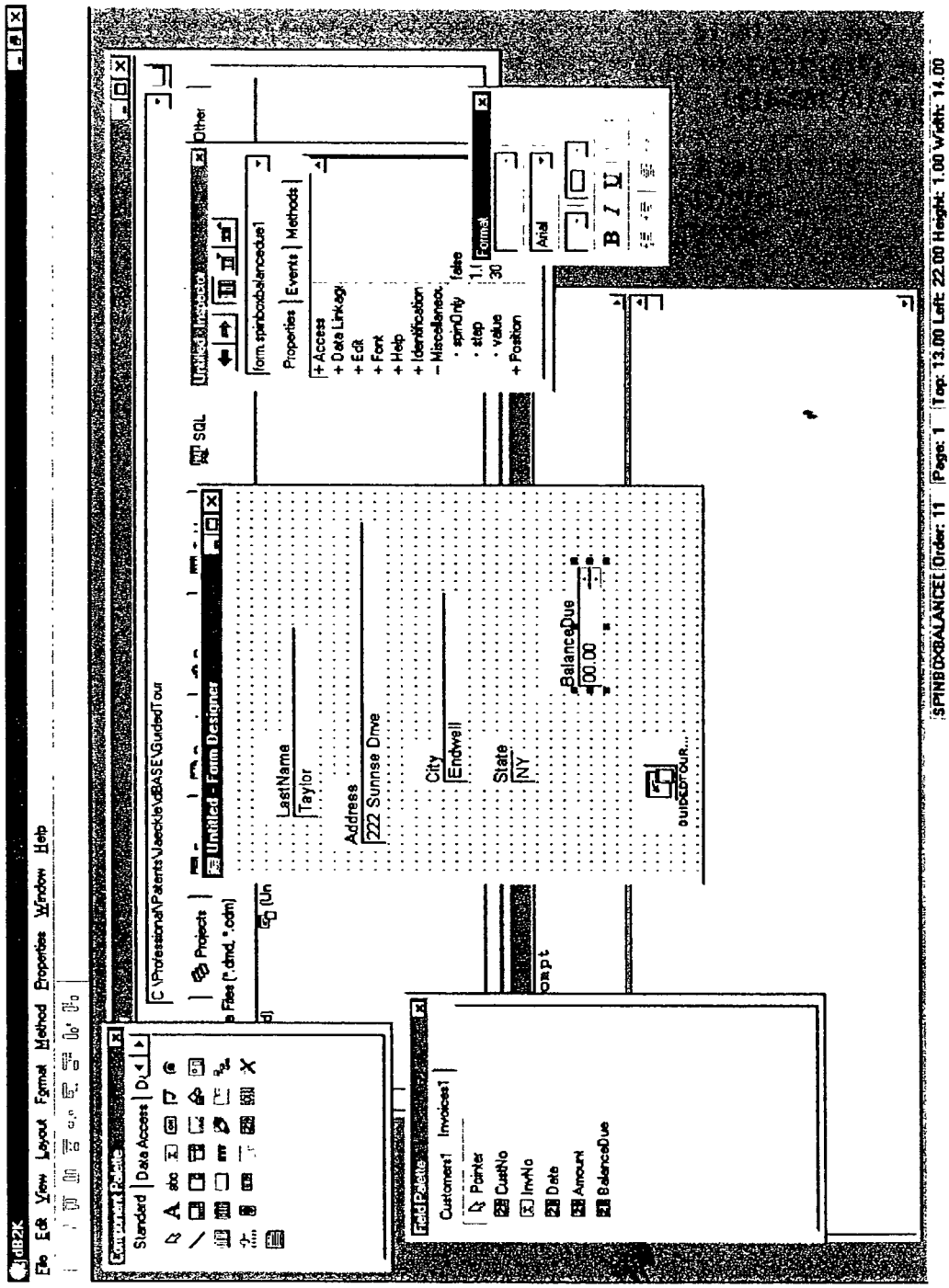
Figure 34:
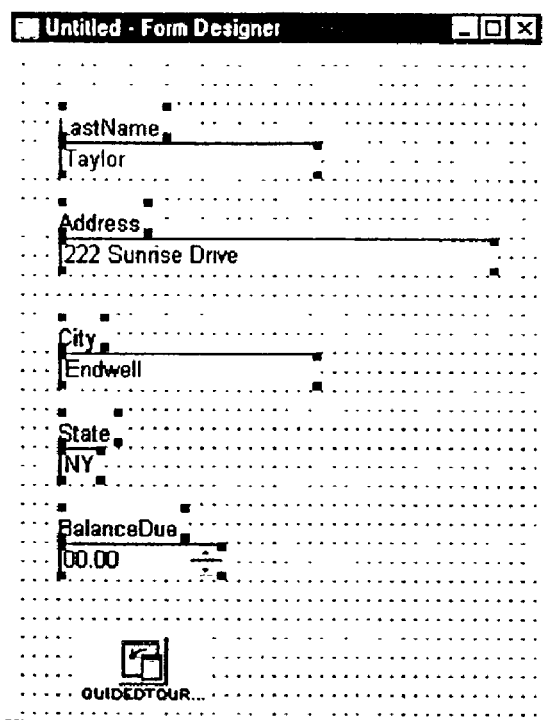
Figure 35:
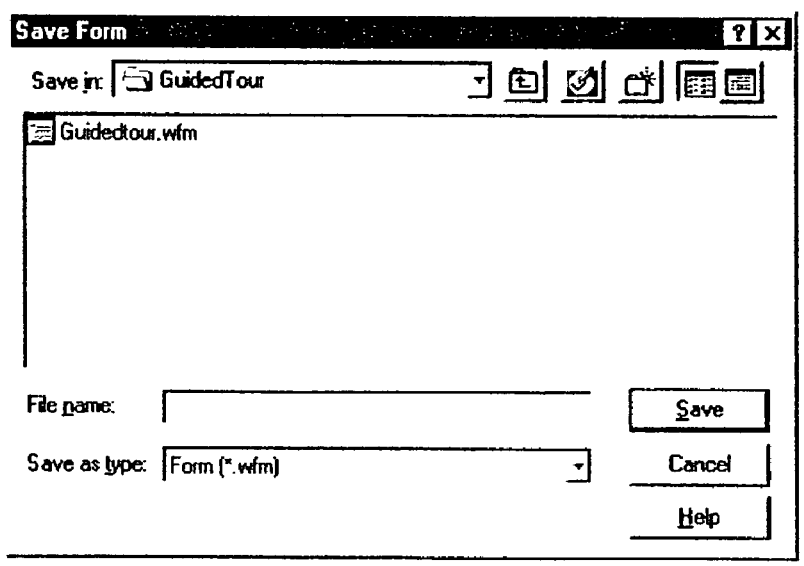
Figure 36:
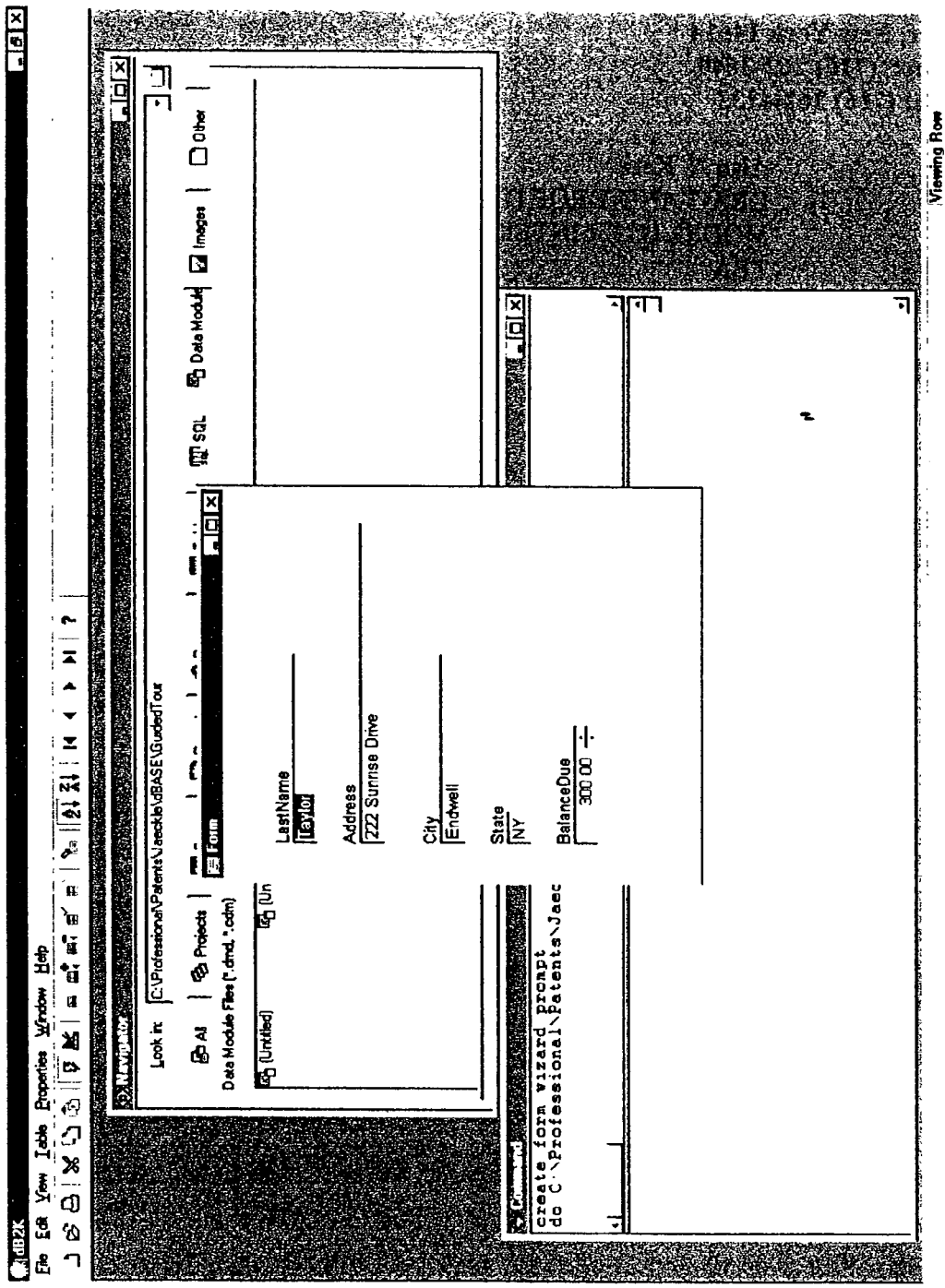
Figure 37:
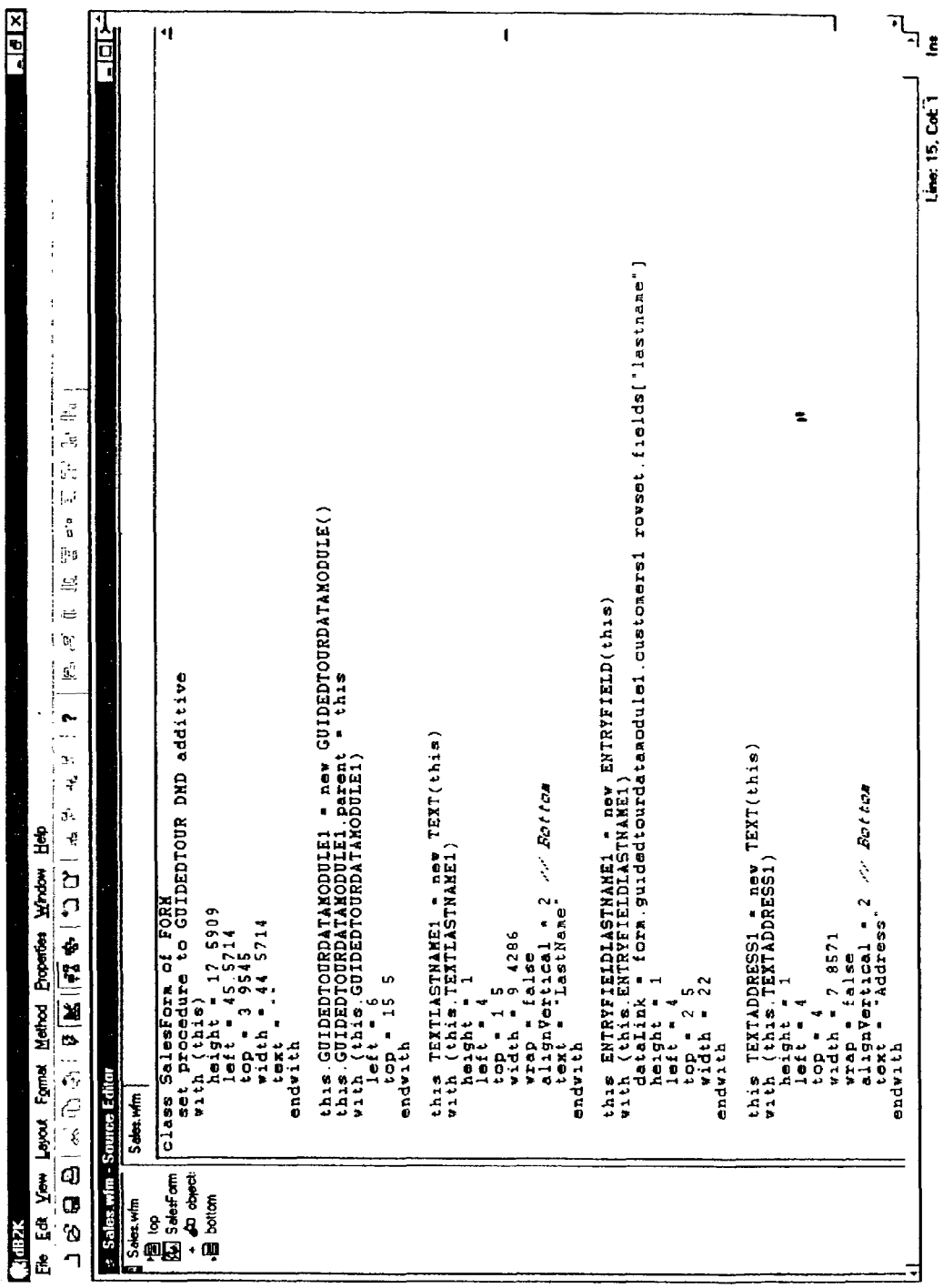

The user then clicks the "Submit" button. The browser returns a confirmation screen telling the user that the data was entered successfully (not shown). By clicking the browser's Back button twice, the user returns to the application's Main Menu Web page. The user may then click on the CUSTOMERSALES.REP link under Reports, and dQuery/Web shows Mr. Vance's record in the report as shown in FIG. 26. A user targeting this application at a Web Server allows the entry of data, in seconds, from anywhere in the world. This means that there are three ways to enter data in databases using dQuery/Web: live through dQuery/Web's Live Data Area, live through dQuery/Web's Windows Application, and live through dQuery/Web's Web application.

CONCLUSION, RAMIFICATIONS, AND SCOPE OF INVENTION

The dQuery/Web example illustrates the use and operation of the invention in a specific application. Because most innovations in related software areas are limited in their scope to a subset of these technologies, no product or invention performs all of the invention's functions. Because the invention performs its functions with no need for extensive sets of files or registrations among multiple systems, it is far simpler both in structure and in usage than similar software using approaches such as CORBA (common object request broker architecture) or COM/DCOM (component object model/distributed component object model). This simplicity constitutes a significant advantage for the invention.

As a result of its power, ease of use, absence of system registration and setup operations, and freedom from client-server restrictions on application placement and operation, the invention offers its users a sharply-reduced total cost of ownership (TCO) in comparison to conventional products. From the above descriptions, figures and narratives, the invention's advantages in providing computer users with interfaces to networked computers, applications, and databases should be clear.

Although the description, operation and illustrative material above contain many specificities, these specificities should not be construed as limiting the scope of the invention but as merely providing illustrations and examples of some of the preferred embodiments of this invention.

Thus the scope of the invention should be determined by the appended claims and their legal equivalents, rather than by the examples given above.

What is claimed:

1. A system for accessing and operating distributed dynamic external objects across a computer network, in response to an application program on at least one client computer comprising:
one or more server computers, each one further comprising one or more interconnected processors, one or more main memory subsystems, one or more mass storage subsystems, and one or more connections to wide area networks or local area networks;
at least one client computer comprising one or more interconnected processors, one or more main memory subsystems, one or more mass storage subsystems, and one or more connections to the server computers via wide area networks or local area networks;
an application software program operating on the client computer for presenting a first form or menu to a user of the client computer and including locations of dynamic external objects used by the application program and for creating an instance of one or more of the dynamic distributed objects on the client computer;
the set of dynamic external object classes including methods and attributes, stored on one or more of the server computers or on one or more of the client computers, said dynamic external object classes comprising object code;
an interpreting software program for converting the located dynamic external objects into machine code on the user's machine and for resolving the class inheritances, polymorphic behaviors, and encapsulation behaviors of the objects, classes, methods, and attributes, across client and server computers in a network, at the time of the user's request for execution of the programs.

2. The system of claim 1, further comprising one or more user interface programs operating on the client computer for interpreting mouse and keyboard actions of the user computer to select the computers on the network holding the objects required by the application program.

3. The system of claim 2, wherein the application programs further comprise data entry, data retrieval, and reporting programs.

4. The system of claim 1, wherein the dynamic external objects are in code executable by the client computer.

5. The system of claim 1, wherein the interpreting software program operating on the client computer interprets the compiled code into machine executable code to create an instance of the object in the client computer.

6. The system of claim 1, wherein the application programs further comprise data entry, data retrieval, and reporting programs.

7. The system of claim 1, further comprising means for providing a user with an alias name for each computer accessed by the application program using the distributed objects.

8. A drag and drop, dynamic, distributed, object model based software user interface system for accessing and operating distributed applications across computer networks, comprising:
two or more peer-to-peer computers, each one further comprising one or more interconnected processors, one or more main memory subsystems, one or more mass storage subsystems, and one or more connections to wide area networks or local area networks;
a first peer computer comprising one or more interconnected processors, one or more main memory subsystems, one or more mass storage subsystems, and one or more connections to the server computers via wide area networks or local area networks;
an application software program operating on the first peer computer for presenting a first form or menu to a user of the first peer computer and including locations of objects used by the application program and for creating an instance of one or more of the dynamic distributed objects on the first peer computer;

the set of dynamic external object classes including methods and attributes, stored on a different peer computer and stored as compiled object code;

an interpreting software program for converting the located dynamic external objects into machine code on the user's machine and for resolving class inheritances, polymorphic behaviors, and encapsulation behaviors of the objects, classes, methods, and attributes, across computers in the network, at the time of the User's request for execution of the application program.

9. The system of claim 8, further comprising a one or more user interface program operating on the first peer computer for interpreting mouse and keyboard actions of the user computer to select the computers on the network holding the objects required by the application program.

10. The system of claim 8, wherein the application program further comprises data entry, data retrieval, and reporting programs.

11. The system of claim 8, wherein the dynamic external objects are in code executable by the first peer computer.

12. The system of claim 8, wherein the interpreting software program operates on the first peer computer for interpreting the compiled code into machine executable code to create an instance of the object in the client computer.

13. The system of claim 8, wherein the user application program further comprises data entry, data retrieval, and reporting programs.

14. A method for implementing dynamic external objects, comprising the steps of:
on one or more first computers, compiling source code for the objects to create dynamic external objects (DEOs) of object code for performing one or more tasks of a launching application program;
on a second computer, installing a launching application with one or more tasks and locations of DEOs on the first computers to enable a user to locate the DEOs corresponding to tasks of the launching application program and create an instance of the dynamic external objects on the second computer for accomplishing the selected task(s); and
interpreting the dynamic external objects on the second computer to perform one or more of the selected tasks of the launching program.

15. A method for using dynamic external objects, comprising the steps of:
providing one or more dynamic external objects comprising object code:
on a user's computer, running an application program that includes one or more tasks to be performed on the user's computer and information about the location of dynamic external objects which correspond to the tasks;
accepting the user's selection of one or more task of the application for execution;
automatically locating the dynamic external objects required to execute each task by creating an instance of the dynamic external objects on the user's computer for execution; and executing the selected tasks of the application on the user's computer.

16. The method of claim 15, wherein the step of locating the dynamic external objects further comprises the steps of:
reading the application's initialization (.ini) file to obtain one or more search paths for locating the required compiled dynamic external objects;
searching in the search paths in their given order to locate each required compiled object;
searching in the folder from which the application was launched for each required compiled object not found in the preceding steps; and
searching in the application's executable (.exe) file for each required compiled object not found in the preceding steps.

17. The method of claim 15, wherein the step of locating the compiled objects further comprises the steps of:
searching in the search paths in their given order to locate each required compiled object;
searching in the folder from which the application was launched for each required compiled object not found in the preceding steps; and
searching in the applications executable (.exe) file for each required compiled object not found in the preceding steps.

18. The method of claim 15, wherein the step of creating an instance of the compiled DEO on the user's computer includes linking the DEO into the RAM of the user's computer for execution on the user's computer and further comprises the step of instancing all parent objects of the required compiled objects into the RAM of the user's computer.

19. The method of claim 15, wherein the step of executing the application further comprises the steps of: resolving all object hierarchy inheritances for each compiled object; executing the application with all inheritances resolved.

20. A method for deploying objects of an application program comprising:
on a network of computers, storing a plurality of objects in object code, each of which has inheritance, polymorphism, and encapsulation;
on one of the computers installing an application program that has the location of objects needed to run an application program;
creating an instance of an object on the computer with the application program; and on the computer with the instance of the object, executing the program.

21. The method of claim 20, comprising the further step of changing the objects on the network.

22. The method of claim 20, wherein the objects are executed without registration.

23. The method of claim 20, wherein the objects inherit properties and methods from their classes.

* * * * *